US010293758B2

(12) United States Patent
Lowell

(10) Patent No.: US 10,293,758 B2
(45) Date of Patent: May 21, 2019

(54) SELF-LEVELING AND SPIN FREE STEERING WHEEL MOUNT ASSEMBLIES

(71) Applicant: Thomas A. Lowell, Talent, OR (US)

(72) Inventor: Thomas A. Lowell, Talent, OR (US)

(*) Notice: Subject to any disclaimer, the term of this patent is extended or adjusted under 35 U.S.C. 154(b) by 0 days.

(21) Appl. No.: 15/854,883

(22) Filed: Dec. 27, 2017

(65) Prior Publication Data

US 2018/0118131 A1    May 3, 2018

Related U.S. Application Data

(63) Continuation-in-part of application No. 15/408,436, filed on Jan. 18, 2017, now Pat. No. 9,908,480, and a continuation-in-part of application No. 15/715,135, filed on Sep. 25, 2017, now Pat. No. 10,220,798.

(60) Provisional application No. 62/301,323, filed on Feb. 29, 2016, provisional application No. 62/523,173, filed on Jun. 21, 2017, provisional application No. 62/452,515, filed on Jan. 31, 2017, provisional application No. 62/448,538, filed on Jan. 20, 2017, provisional application No. 62/565,610, filed on Sep. 29, 2017.

(51) Int. Cl.
  *B62J 11/00* (2006.01)
  *B60R 11/02* (2006.01)
  *B60R 11/00* (2006.01)

(52) U.S. Cl.
  CPC ..... *B60R 11/0241* (2013.01); *B60R 2011/001* (2013.01); *B60R 2011/0059* (2013.01); *B60R 2011/0071* (2013.01); *B60R 2011/0085* (2013.01)

(58) Field of Classification Search
  CPC .......................... B60R 2011/001; B60N 3/005
  USPC ......................................................... 224/276
  See application file for complete search history.

(56) References Cited

U.S. PATENT DOCUMENTS

| 2,150,709 A | 3/1939 | Bake |
| 4,455,454 A | 6/1984 | Umebayashi |
| 4,698,838 A | 10/1987 | Ishikawa et al. |
| 4,850,015 A | 7/1989 | Martin |
| 4,852,147 A | 7/1989 | Suzuki et al. |
| 5,060,260 A | 10/1991 | O'Connell |
| 5,086,510 A | 2/1992 | Guenther et al. |

(Continued)

FOREIGN PATENT DOCUMENTS

| CN | 204978447 U | 1/2016 |
| DE | 4220016 A1 | 12/1993 |

(Continued)

*Primary Examiner* — Brian D Nash
(74) *Attorney, Agent, or Firm* — Sughrue Mion, PLLC

(57) ABSTRACT

A mounting assembly, for mounting an electronic device to a steering wheel assembly, includes: a base, attached to a first portion of the steering wheel assembly; a stud shaft, protruding from the base and to which the electronic device is selectively attachable via a clip attached to a back surface of the electronic device; a restraining leash, a first end of which is attached to a second portion of the steering wheel assembly, and a second end of which is secured to the base such that the base is attached to the steering wheel assembly at the first portion and the second portion; a locking mechanism, for selectively locking the electronic device to the stud shaft; and a stabilizing wand, for preventing inadvertent rotation of the electronic device about the stud shaft.

24 Claims, 27 Drawing Sheets

(56) References Cited

U.S. PATENT DOCUMENTS

| | | | |
|---|---|---|---|
| 5,177,665 A * | 1/1993 | Frank | B60R 11/0252 |
| | | | 108/44 |
| 5,319,803 A | 6/1994 | Allen | |
| 5,385,283 A * | 1/1995 | Shioda | B60N 3/005 |
| | | | 224/276 |
| 5,453,929 A | 9/1995 | Stove | |
| 5,622,296 A | 4/1997 | Pirhonen et al. | |
| 5,697,071 A | 12/1997 | Fan | |
| 5,991,646 A | 11/1999 | Frank et al. | |
| 6,131,042 A | 10/2000 | Lee et al. | |
| 6,149,116 A | 11/2000 | Won | |
| 6,305,217 B1 | 10/2001 | Mansfeld et al. | |
| 6,328,271 B1 | 12/2001 | Haage et al. | |
| 6,840,487 B2 | 1/2005 | Carnevali | |
| 6,888,940 B1 | 5/2005 | Deppen | |
| 6,948,259 B1 * | 9/2005 | Hatfield | G01B 5/0025 |
| | | | 33/600 |
| 6,983,170 B2 | 1/2006 | Stulberger | |
| 7,062,300 B1 | 6/2006 | Kim | |
| 7,374,142 B2 | 5/2008 | Carnevali | |
| 7,992,831 B2 | 8/2011 | Fan | |
| 8,360,378 B1 | 1/2013 | Owens | |
| 8,496,144 B2 | 7/2013 | Son | |
| 9,193,375 B2 | 11/2015 | Schramm et al. | |
| 9,369,790 B2 | 6/2016 | Schreiber et al. | |
| 9,581,291 B2 * | 2/2017 | Trotsky | F16M 11/041 |
| 9,637,062 B2 | 5/2017 | Tyrer | |
| 9,821,725 B2 * | 11/2017 | Tyrer | B60R 11/02 |
| 9,908,480 B1 * | 3/2018 | Lowell | B60R 11/02 |
| 2005/0077334 A1 | 4/2005 | Craig, Jr. | |
| 2007/0029359 A1 | 2/2007 | Smith | |
| 2011/0024470 A1 | 2/2011 | Hajarian | |

FOREIGN PATENT DOCUMENTS

| | | |
|---|---|---|
| DE | 19739626 A1 | 6/1998 |
| GB | 2326560 A | 12/1998 |

* cited by examiner

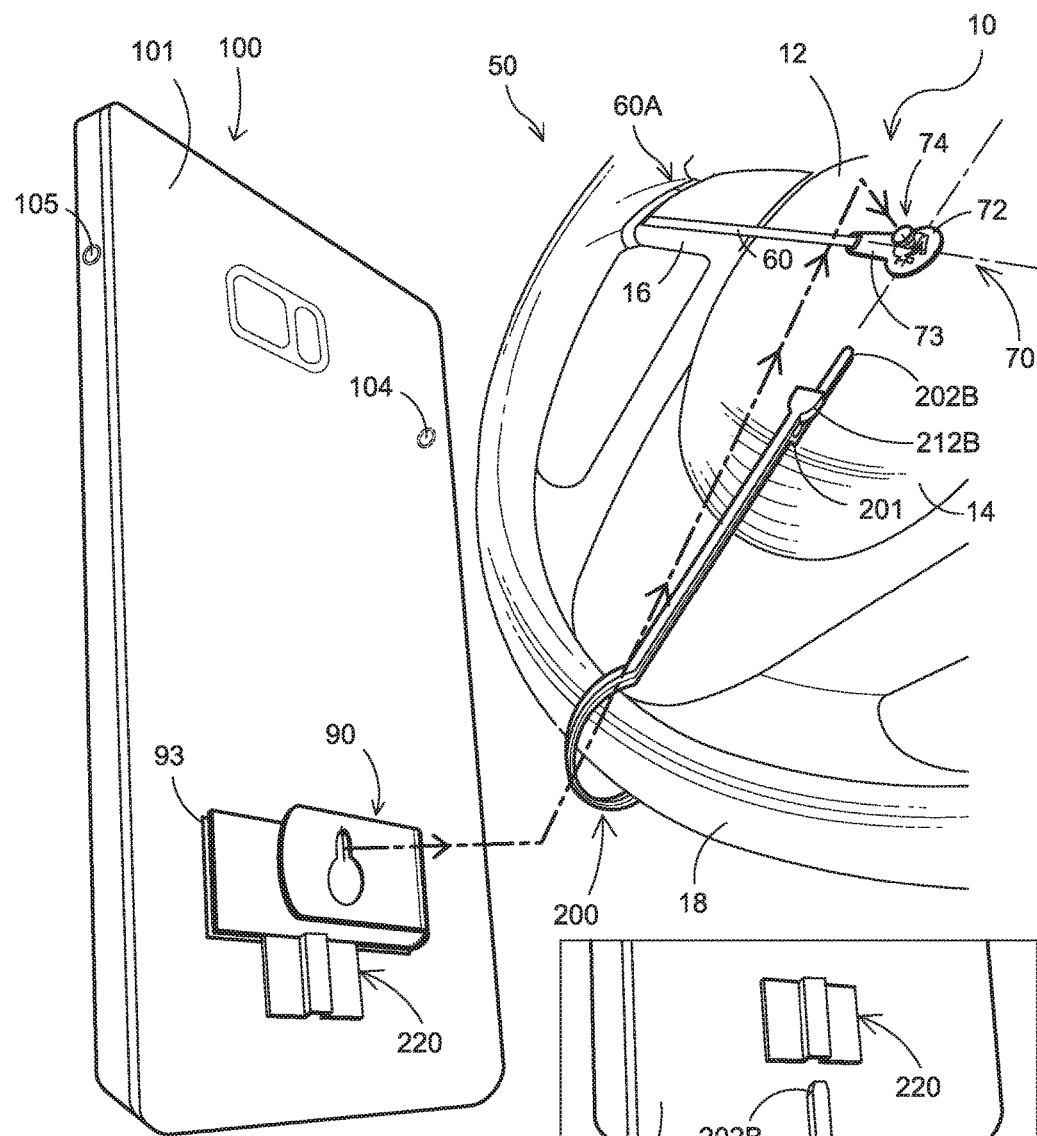
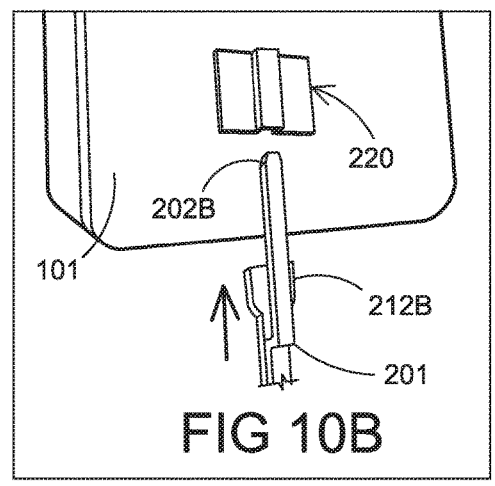
FIG 10A
FIG 10B

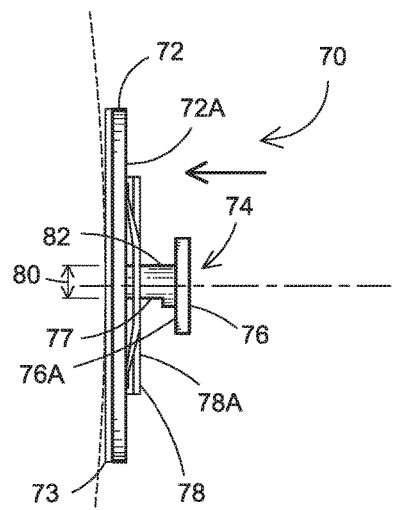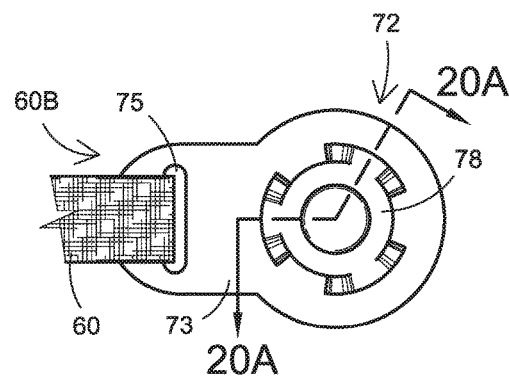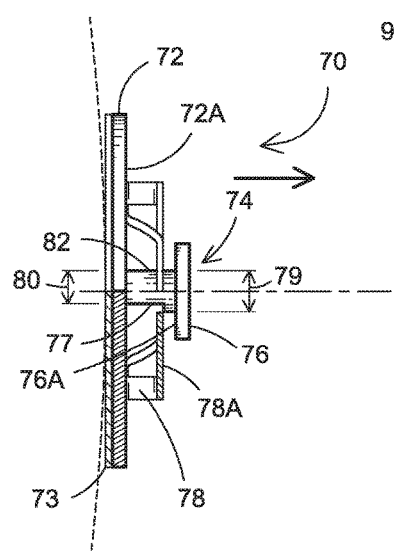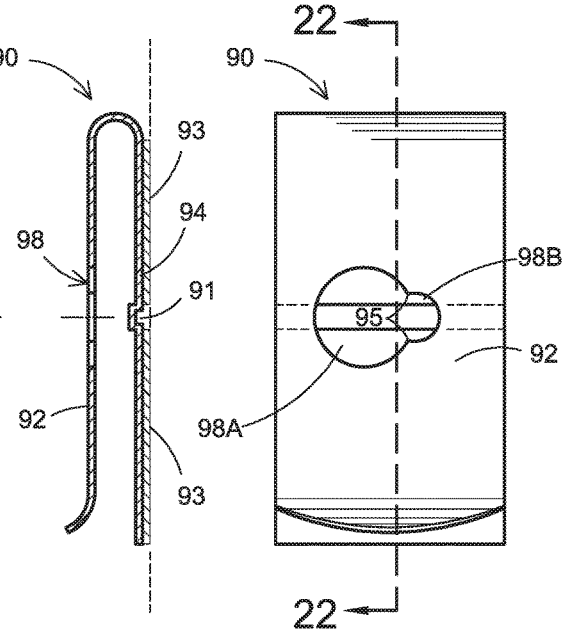
FIG 18A  FIG 19  FIG 20A  FIG 22  FIG 21

SELF-LEVELING AND SPIN FREE STEERING WHEEL MOUNT ASSEMBLIES

CROSS REFERENCE TO RELATED APPLICATIONS

This patent application is a continuation-in-part of U.S. patent application Ser. No. 15/408,436, filed Jan. 18, 2017, entitled SELF LEVELING STEERING WHEEL MOUNT ASSEMBLY which is currently pending and claims priority to U.S. Provisional Patent Appl'n Ser. No. 62/301,323, entitled SELF LEVELING VEHICLE STEERING WHEEL SMART PHONE QUICK RELEASE MOUNTING, filed on Feb. 29, 2016. This patent application is a continuation-in-part of U.S. patent application Ser. No. 15/715,135, filed Sep. 25, 2017, entitled SELF LEVELING STEERING WHEEL MOUNT ASSEMBLY FOR ELECTRONIC CELL PHONE DEVICE HAVING SIDE CAMERA, which is currently pending and claims priority to U.S. Provisional Patent Appl'n Ser. No. 62/301,323, entitled SELF LEVELING VEHICLE STEERING WHEEL SMART PHONE QUICK RELEASE MOUNTING, filed on Feb. 29, 2016, and U.S. Provisional Patent Appl'n Ser. No. 62/523,173, filed on Jun. 21, 2017, entitled NO SPIN STEERING WHEEL AND BELT ATTACHMENT DEVICE INCLUDING A STATIONARY SUPPORT/CHARGING WAND. This application also claims the benefit of U.S. Provisional Patent Appl'n Ser. No. 62/523,173, filed on Jun. 21, 2017, entitled NO SPIN STEERING WHEEL AND BELT ATTACHMENT DEVICE INCLUDING A STATIONARY SUPPORT/CHARGING WAND; U.S. Provisional Patent Appl'n Ser. No. 62/452,515, filed on Jan. 31, 2017, entitled BELT CLIP/LOCKING MECHANISM FOR NON-ROTATING ELECTRONIC DEVICE HOLDER ATTACHMENT TO VEHICLE STEERING WHEEL; and U.S. Provisional Patent Appl'n Ser. No. 62/448,538, filed on Jan. 20, 2017, entitled MULTI FUNCTION SMALL ELECTRONIC DEVICE HOLDER CLIP, and U.S. Provisional Patent Appl'n Ser. No. 62/565,610 filed on Sep. 29, 2017, entitled VEHICLE STEERING WHEEL MOUNTED NON-ROTATING HEADS UP DISPLAY. All of the above-mentioned applications are incorporated herein by reference in their entireties and for all purposes.

TECHNICAL FIELD

The present disclosure relates to a mounting system for mobile handheld electronic devices (e.g., cell phones, smartphones, tablets, phablets, cameras, computers, global positioning system (GPS) devices, music players, etc., hereinafter generally referred to as "device(s)"), for use by a moving vehicle's driver, and more particularly to the driver's safe use of these devices by virtue of providing for their use upon a steering wheel.

BACKGROUND

The use of electronic devices, such as cell phones, smartphones, tablets, phablets, cameras, computers, GPS devices, music players, etc. by a driver of a vehicle has become commonplace in modern society. Unfortunately, use of such devices is distracting. This is particularly true if the electronic device is required to be hand held by the driver. These types of distractions are particularly dangerous and have been known to cause serious accidents. In addition, even when mounting structures are provided on or above the dashboard, the driver typically must divert his or her eyes from the road and/or remove his or her hands from the steering wheel to engage the electronic device, thereby diverting attention from the task of safely driving the vehicle.

As evidence of this danger, according to the most recent statistics at the time of preparing this specification, the National Safety Council ("NSC") reports that cell phone use while driving leads to 1.6 million crashes each year. Further, nearly 330,000 injuries occur each year from accidents caused by texting while driving and one out of every four car accidents in the United States is caused by texting and driving. Finally, texting while driving is six times more likely to cause an accident than driving drunk.

In response to the above-noted danger, the use of device mounts has become commonplace. These device mounts may be divided into two classes. The first class of mounts includes "off-steering-wheel" mounts (i.e., mounts attached to the vehicle at locations other than the steering wheel). As a result of its location, this class of device mounts requires the driver to turn his or her head, thereby diverting his or her eyes from of the road, in order to observe the mounted device. In addition, the driver must remove at least one hand from the steering wheel in order to physically interact with the mounted device. The second class of mounts includes steering-wheel mounts (i.e., mounts attached to the steering wheel). These mounts attempt to address the above-noted deficiencies of the first class by locating the mount on the steering wheel itself. As a result, the driver is required to divert his or her eyes less since the device is mounted at least partially within a safe driving line of sight. In addition, the driver is not required to remove his or her hands from the steering wheel in order to physically interact with the mounted device given the device's proximity to the driver's hands on the steering wheel.

The second class of mounts may be further divided into two subclasses of steering-wheel mounts. The first subclass of steering-wheel mounts includes mounts configured to mount the device on an axis of rotation of the steering wheel. On the other hand, the second subclass of steering-wheel mounts includes mounts configured to mount the device at any other location than on the axis of rotation of the steering wheel. As shown in FIGS. 1, 3A and 3B, with a device 1000 is mounted on an axis of rotation of a steering wheel 1010 as in the first subclass of steering-wheel mounts, the device 1000 is located at a "low" position relative to a safe driving line of sight 1020. As a result, in order for the driver to observe the mounted device 1000, the driver must at least intermittently divert his or her eyes from the road (see unsafe view cone 1022, FIG. 3B). Further, as shown in FIG. 2, with the device 1000 mounted at a location other than on the axis of rotation of the steering wheel 1010 as in the second subclass of steering-wheel mounts, with the device 1000 mounted in such a location, problems arise in that the device 1000 is rotated/moved concurrently with the steering wheel 1010 as the steering wheel 1010 is rotated by the driver (see, e.g., CN Pub. No. 204978447). As a result, the device 1000 becomes difficult to observe or interact with as the steering wheel 1010 rotates. Accordingly, both subclasses of steering-wheel mounts include significant deficiencies.

Within the first subclass of steering-wheel mounts, some prior art mounts (see, e.g., U.S. patent application Ser. No. 12/804,815 (published Feb. 3, 2011 as U.S. Pub. No. 2011/0024470)) have relied upon gravity to maintain the mounted device in an upright position, as shown in FIG. 1. As a result, the device must necessarily be attached to the mount at a point above the device's center-of-gravity which results in the device being located even lower relative to a safe driving line of sight. Accordingly, in order for the driver to observe the mounted device, the driver must divert his or her eyes from the road. In addition, because the mounted device is permitted to rotate freely, the mounted device may rotate in response to: (1) static friction between the device and the mount and/or between components of the mount; (2) the device's inertia; (3) inadvertent contact with the device; etc. In addition, some devices (e.g., Samsung Galaxy S8) require a user to activate the device on a backside of the device. When the device is mounted on the axis of rotation of the steering wheel, a center console of the steering wheel may make the backside of the mounted device at least partially inaccessible thereby making it difficult, if not impossible, to activate the device.

Furthermore, traditional device mounts may, under certain circumstances (e.g., excessive rotation, inadvertent contact, a wreck, airbag deployment, etc.), permit the mounted device to become disconnected from the mount. Among other dangers, this can cause a distraction to the driver as the driver seeks to locate and remount the device. This can also cause safety concerns if the cell phone becomes disconnected during a wreck or airbag deployment as the device may be disconnected from the mount at a high rate of speed. Similarly, under certain circumstances (e.g., airbag deployment, etc.), even if the device remains connected to the mount, the device may be propelled from the steering wheel at a high rate of speed. In each of these circumstances, the device may pose a significant danger to the driver and other passengers of the vehicle.

Finally, it is has been determined that the components of traditional mounts secured to the device are otherwise useless in mounting the device to other objects and/or surfaces (e.g., a belt, a wall, a desk, etc.) besides the cell phone mount. In addition, traditional mounts fail to consider or provide for connectivity to an external power source to power or recharge the mounted device. As a result, the driver must frequently dismount the device to recharge the device or deal with the presence of a distracting power/charge cord.

As one development, some vehicles (see, e.g., Tesla Model 3) locate an instrument display 1030 outside of a safe driving line of sight 1020 (e.g., at a center of the dashboard) as shown in FIG. 3A and the unsafe view cone 1024 of FIG. 3C. As a result, in order for the driver to observe the instrument display 1030, the driver must intermittently divert his or her eyes from the road (see FIG. 3C). Accordingly, new apps from Google Play and the App Store (i.e., iTunes) have become available with the purpose of reducing driver distractions. These apps function to make user interfaces of the device simpler thereby making interaction with the device more efficient and therefore safer. Importantly, however, in order to observe the mounted device, the driver must nevertheless intermittently divert his or her eyes from the road and/or deal with rotation/movement of the mounted device concurrently with the steering wheel as the steering wheel is rotated by the driver.

Accordingly, although others have attempted to improve the safety of use of devices by the driver of a vehicle, there remain significant deficiencies and room for further improvement.

For example, U.S. Pat. No. 2,150,709 issued to Bake discloses mounting a "board" or "plate" to a steering wheel using cross members of the steering wheel. The disclosure of Bake is deficient, however, at least in that: (1) the "board" or "plate" is located at least partially outside of the driver's line of sight; (2) the mounted "board" or "plate" rotates concurrently with the steering wheel; (3) the "board" or "plate" prevents effective deployment of an airbag; etc.

As other examples, U.S. Pat. No. 5,060,260 issued to O'Connell, U.S. Pat. No. 5,622,296 issued to Pirhonen et al., and U.S. Pat. No. 6,328,271 issued to Haage et al. disclose swiveling device mounts. The disclosures of O'Connell, Pirhonen, and Haage are deficient, however, at least in that: (1) the mounted device is located at least partially outside of the driver's line of sight; (2) the mounted device rotates/moves concurrently with the steering wheel; (3) the mounted device may rotate inadvertently; (4) the backside of the mounted device is at least partially inaccessible; etc. In addition, the disclosures of O'Connell, Pirhonen, and Haage fail to provide a mechanism by which the mounted device may be effectively "locked" to the mount. As a result, the mounted device may become disconnected from the mount thereby posing a danger to the driver and other passengers of the vehicle as noted above. Finally, the disclosures of O'Connell, Pirhonen, and Haage fail to consider or provide for connectivity to an external power source.

Similarly, U.S. Pub. No. 2007/0029359 by Smith and U.S. Pub. No. 2011/0024470 by Hajarian disclose that gravity may be used to assist in keeping device attached by a swivel mount in remaining in an "about" upright position. The disclosures of Smith and Hajarian are deficient, however, at least in that: (1) the mounted device is located at least partially outside of the driver's line of sight; (2) the mounted device rotates/moves; (3) the mounted device may rotate inadvertently; (4) the backside of the mounted device is at least partially inaccessible; etc. In addition, the disclosures of Smith and Hajarian fail to provide a mechanism by which the mounted device may be effectively "locked" to the mount and fail to consider or provide for connectivity to an external power source.

As yet another example, U.S. Pat. No. 6,983,170 issued to Stulberger discloses the use of a "breakaway" wire for the purpose of non-interference with airbag deployment, but fails to disclose an apparatus or method by which the mounted device may be effectively "locked" to the mount so as to not become a danger to the driver and other passengers of the vehicle as noted above. Stulberger further discloses the use of a power/charge cord (i.e., "recharging wire"), but fails to disclose an apparatus or method by which the power/charge cord may be retained so as to not become a distraction to the driver. Furthermore, the disclosure of Stulberger is deficient at least in that: (1) the mounted device is located at least partially outside of the driver's line of sight; (2) the mounted device rotates/moves concurrently with the steering wheel; etc.

As yet another example, CN Pub. No. 204978447 (see FIG. 2) attempts to address some of the above-described deficiencies by mounting a device relatively high on a steering wheeling in conjunction with the use of a swiveling mount. Nevertheless, this disclosure remains deficient at least in that: (1) the mounted device remains at least partially outside of the driver's line of sight; (2) the mounted device rotates/moves concurrently with the steering wheel; (3) the mounted device may rotate inadvertently; (4) the backside of the mounted device is at least partially inaccessible; etc. In addition, the disclosure fails to provide a mechanism by which the mounted device may be effectively "locked" to the mount and fails to consider or provide for connectivity to an external power source.

As yet other examples, which are deficient for at least the same reasons as discussed above, the following are noted: U.S. Pat. No. 4,455,454 issued to Umebayashi; U.S. Pat. No. 4,698,838 issued to Ishikawa et al.; U.S. Pat. No. 4,850,015 issued to Martin; U.S. Pat. No. 4,852,147 issued to Suzuki et al.; U.S. Pat. No. 5,086,510 issued to Guenther et al.; U.S.

Pat. No. 5,319,803 issued to Allen; U.S. Pat. No. 5,453,929 issued to Stove; U.S. Pat. No. 5,991,646 issued to Frank et al.; U.S. Pat. No. 6,131,042 issued to Lee; DE 197 39 626 by Weilbacher; DE 42 20 016 by Wardyn; and U.K. Pat. No. GB 2 326 560 issued to Stulberger.

Accordingly, it is noted that each of the aforementioned disclosures is deficient for at least the above-noted reasons. As a result, each of the aforementioned disclosures provides an unsafe, insecure or inconvenient mounting system. For all these reasons, it is readily apparent that a new and improved steering-wheel mount assembly is needed that will allow a driver to use devices in a safe, secure, and convenient manner by overcoming the above-noted deficiencies present in the aforementioned disclosures. In particular, the present disclosure describes a steering-wheel mount assembly that provides at least the following advantages: (1) the mounted device is located substantially within a safe driving line of sight at a relatively "high" position; (2) the fixed location of the mounted device is maintained regardless of steering wheel rotation (i.e., the mounted device does not rotate/ move concurrently with the steering wheel); (3) the mounted device is maintained in an upright position (i.e., inadvertent rotation of the device is prohibited); (4) the backside of the mounted device (where biometric fingerprint sensors are sometimes located, see FIG. 15 sensors 102 and 103) is accessible to the driver; (5) mechanisms are provided for effectively "locking" the device to the mount; (6) the mount provides for the connectivity to an external power source; (7) a clip of the mount is universally usable to secure the device to other objects and/or surfaces (e.g., a belt, a wall, a desk, etc.); (8) cost savings are realized; etc. Although these advantages will become obvious throughout the present disclosure, other significant advantages may also be achieved and the aforementioned advantages should not be considered exhaustive or limiting in any manner.

The present disclosure has been developed in light of these problems and others that occur in the prior art. It should be appreciated, however, that the advantages obtained by the present disclosure are not limited to solving the above-described problems and admittedly provides a number of other significant advantages over the prior art.

SUMMARY

One aspect of the present disclosure is directed to a mounting assembly for mounting an electronic device to a steering wheel assembly. The mounting assembly may comprise: a means for attaching the electronic device to a center of the steering wheel whereby gravity maintains the electronic device in a substantially upright position regardless of the rotation of the steering wheel; and a stabilizing wand, a first end of the stabilizing wand being attached to a stationary portion of a vehicle interior, a second end of the stabilizing wand being selectively attachable to the electronic device. The stabilizing wand may be configured to prevent rotation of the electronic device with the electronic device attached to the stud shaft.

In accordance with the above-described aspect of the present disclosure, the means for attaching the electronic device comprises an axially located stud shaft protruding from a base attached to the steering wheel assembly, the stud shaft protruding from the base at the axis of rotation of the steering wheel assembly, and the electronic device may be attached to the stud shaft such that a center-of-gravity of the electronic device is located above the stud shaft.

In accordance with the above-described aspect of the present disclosure, the stabilizing wand may comprise a rigid or semi-rigid support member and at least one support clip. A first end of the support member may be attached to the stationary portion of the vehicle interior by the at least one support clip and a second end of the support member may be attached to the electronic device.

In accordance with the above-described aspect of the present disclosure, the steering wheel assembly may further comprise a bracket attached to a backside of the electronic device. The bracket may be configured to receive the second end of the support member.

In accordance with the above-described aspect of the present disclosure, the bracket may comprise a slot which in combination with the backside of the electronic device provides a passage configured to receive the second end of the support member.

In accordance with the above-described aspect of the present disclosure, the steering wheel assembly may further comprise a clip attached to a backside of the electronic device. The clip may be configured to receive the second end of the support member.

In accordance with the above-described aspect of the present disclosure, the electronic device may comprise a protective case configured to receive the second end of the support member.

In accordance with the above-described aspect of the present disclosure, the support member may have a profile that corresponds to a profile of the steering wheel assembly.

In accordance with the above-described aspect of the present disclosure, the steering wheel assembly may further comprise a cord attached to the stabilizing wand. The cord may be a power cord configured to provide power to the electronic device or a data cord configured to transmit data between the electronic device and the vehicle.

Another aspect of the present disclosure is directed to a mounting assembly for mounting an electronic device to a steering wheel assembly. The mounting assembly may comprise: a means for attaching the electronic device to a center of the steering wheel whereby gravity maintains the electronic device in a substantially upright position regardless of the rotation of the steering wheel; and a restraining leash. A first end of the restraining leash may be attached to the steering wheel assembly. A second end of the restraining leash may be secured to the means for attaching the electronic device, whereby in the event of an airbag deployment the restraining leash limits movement of the means for attaching the electronic device and the attached electronic device, thus preventing injury to the driver of the vehicle.

In accordance with the above-described aspect of the present disclosure, the means for attaching the electronic device may comprise a headed stud shaft protruding from a base attached to the steering wheel assembly; the steering wheel assembly may comprise a steering wheel, and the base may be attached to the steering wheel assembly such that the headed stud shaft extends collinearly along an axis of rotation of a steering wheel.

In accordance with the above-described aspect of the present disclosure, the steering wheel assembly may comprise a steering wheel, and the first end of the restraining leash may be attached to a cross member of the steering wheel.

In accordance with the above-described aspect of the present disclosure, the steering wheel assembly may comprise a steering wheel, and the first end of the restraining leash may be attached to a rim of the steering wheel.

In accordance with the above-described aspect of the present disclosure, the means for attaching the electronic device may comprise a headed stud shaft protruding from a base attached to the steering wheel assembly; the steering wheel assembly may further comprise a clip. The clip may be attached to the electronic device. The clip may be selectively attachable to the stud shaft.

In accordance with the above-described aspect of the present disclosure, the headed stud shaft may comprise a smaller cross-sectional portion and a larger cross-sectional portion. The smaller portion may comprise a portion of the headed stud shaft having a reduced cross-sectional width. The width of the smaller portion, taken perpendicular to the axis of the stud shaft, may be less than a diameter of the stud shaft at the larger portion. The clip may comprise an opening configured to receive the stud shaft. The opening may comprise: a first opening and a second opening. The first opening may be larger than the second opening, the first opening and the second circular opening may overlap, and a chord length, defined as the length of an opening between the first opening and the second opening, may be less than the diameter of the larger portion of the stud shaft but greater than the width of the smaller portion of the stud shaft, whereby the electronic device is secured to the stud shaft.

In accordance with the above-described aspect of the present disclosure, the steering wheel assembly may further comprise a biasing member disposed on the stud shaft. The biasing member may be configured to bias the clip toward the larger portion of the stud shaft.

In accordance with the above-described aspect of the present disclosure, the means for attaching the electronic device may comprise a headed stud shaft protruding from a base attached to the steering wheel assembly; the steering wheel assembly may further comprise a stabilizing wand configured to prevent rotation of the electronic device with the electronic device attached to the headed stud shaft.

In accordance with the above-described aspect of the present disclosure, the stabilizing wand may comprise a support member. A first end of the support member may be attached to the steering wheel assembly and a second end of the support member may be attached to the electronic device.

In accordance with the above-described aspect of the present disclosure, the electronic device comprises at least one camera located on a side surface of the electronic device.

Another aspect of the present disclosure is directed to a mounting assembly for mounting an electronic device to a steering wheel assembly. The mounting assembly may comprise: a base, the base being attached to a first portion of the steering wheel assembly center console; an axially located headed stud shaft, the headed stud shaft protruding from the base at the axis of rotation of the steering wheel assembly, the stud shaft comprising a smaller portion and a larger portion, the smaller portion comprising a portion of the headed stud shaft having a deduced width, the width of the smaller portion, taken perpendicular to the axis of the headed stud shaft, being less than a diameter of the headed stud shaft at the larger portion, and a clip, the clip being attached to the electronic device, the clip being selectively attachable to the stud shaft, the clip comprising an opening, the opening being configured to receive the stud shaft. The opening may comprise: a first opening; and a second opening. The first opening may be larger than the second opening, the first opening and the second opening may overlap, and a chord length, defined as the length of an opening between the first opening and the second opening, may be less than the diameter of the larger portion of the stud shaft but greater than the width of the smaller portion of the stud shaft, whereby the electronic device is secured to the stud shaft.

In accordance with the above-described aspect of the present disclosure, the steering wheel assembly may further comprise a biasing member disposed on the stud shaft. The biasing member may be configured to bias the clip toward the larger portion of the headed stud shaft.

In accordance with the above-described aspect of the present disclosure, with the electronic device in an upright position, the second opening may be located above the first opening.

In accordance with the above-described aspect of the present disclosure, with the electronic device in a horizontal position, the second opening may be located to the side of the first opening.

In accordance with the above-described aspect of the present disclosure, the steering wheel assembly may further comprise a stabilizing wand configured to prevent rotation of the electronic device with the electronic device attached to the stud shaft, particularly when the position of the clip which attaches the device to the mounting stud is located below the resulting center of gravity of the device.

In accordance with the above-described aspect of the present disclosure, the stabilizing wand may comprise a support member. A first end of the support member may be attached to the steering wheel assembly and a second end of the support member may be attached to the electronic device.

Another aspect of the present disclosure is directed to a method of providing a display in a vehicle. The method may comprise attaching an electronic device to the rotational center of the steering wheel assembly; maintaining the electronic device in an upright position using a stabilizing wand; and providing information about the vehicle to the electronic device.

In accordance with the above-described aspect of the present disclosure, the electronic device may be attached to the steering wheel assembly using a mounting assembly comprising a base attached to the steering wheel assembly, and an axially located headed stud shaft protruding from the base at the axis of rotation of the steering wheel assembly; and the method may further comprise attaching the electronic device to the steering wheel assembly such that a center-of-gravity of the electronic device is located above the stud shaft.

In accordance with the above-described aspect of the present disclosure, the electronic device may be attached to the steering wheel assembly using a mounting assembly comprising a base attached to the steering wheel assembly, and an axially located headed stud shaft protruding from the base at the axis of rotation of the steering wheel assembly; and the method may further comprise attaching the base to the steering wheel assembly using a restraining leash at a position different from the base.

In accordance with the above-described aspect of the present disclosure, the electronic device may be attached to the steering wheel assembly using a mounting assembly comprising a base attached to the steering wheel assembly, and an axially located headed stud shaft protruding from the base at the axis of rotation of the steering wheel assembly; and the method may further comprise locking the electronic device to the stud shaft using a clip attached to a backside of the electronic device. The clip may comprise an opening configured to receive the stud shaft. The opening may comprise: a first opening, and a second opening. The first opening may be larger than the second opening, the first opening and the second opening may overlap, and a chord length, defined as the length of an opening between the first opening and the second opening, may be less than the diameter of the larger portion of the stud shaft but greater than the width of the smaller cross-sectional portion of the stud shaft.

In accordance with the above-described aspect of the present disclosure, the method may further comprise charging the electronic device using a power cord attached to the stabilizing wand or transmitting data between the electronic device and the vehicle using a power cord attached to the stabilizing wand.

BRIEF DESCRIPTION OF THE DRAWINGS

FIG. 10A is an exploded perspective view of the steering wheel assembly and mounting assembly of FIG. 4;

FIG. 10B is a perspective view showing a support member being mounted to bracket of the mounting assembly of FIG. 10A.

FIGS. 18A-18D are detailed side views of the steering wheel assembly and the mounting assembly of FIG. 4 with a biasing member of the mounting assembly in a compressed position;

FIG. 19 is a detailed front view of the steering wheel assembly and the mounting assembly of FIG. 4;

FIGS. 20A-20D are a detailed partial cross-sectional side views of the steering wheel assembly and the mounting assembly of FIG. 4 taken along line 20-20 of FIG. 19 with the biasing member of the mounting assembly in a decompressed position;

FIG. 21 is a front view of a clip of the mounting assembly of FIG. 4;

FIG. 22 is a cross-sectional side view of the clip of FIG. 21 taken along the line 22-22 of FIG. 21;

DETAILED DESCRIPTION OF EMBODIMENTS

Figure 1:
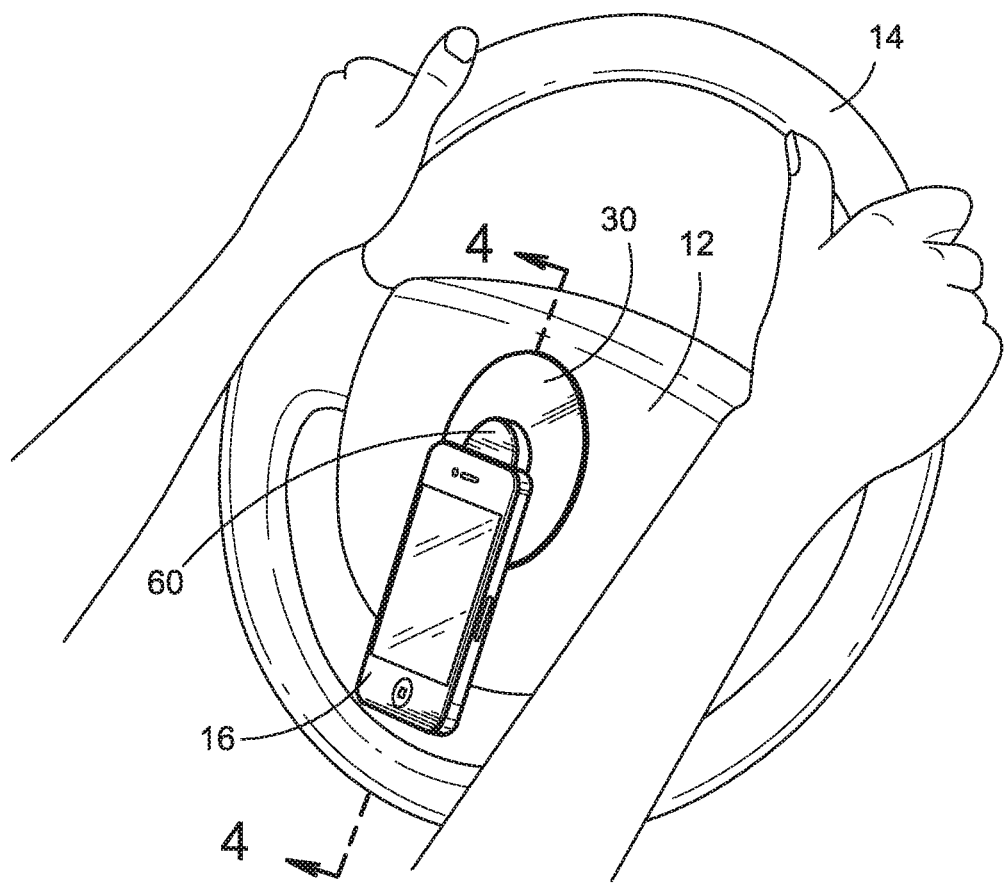
FIG. 1 is a perspective view of a conventional mounting assembly.
Figure 2:
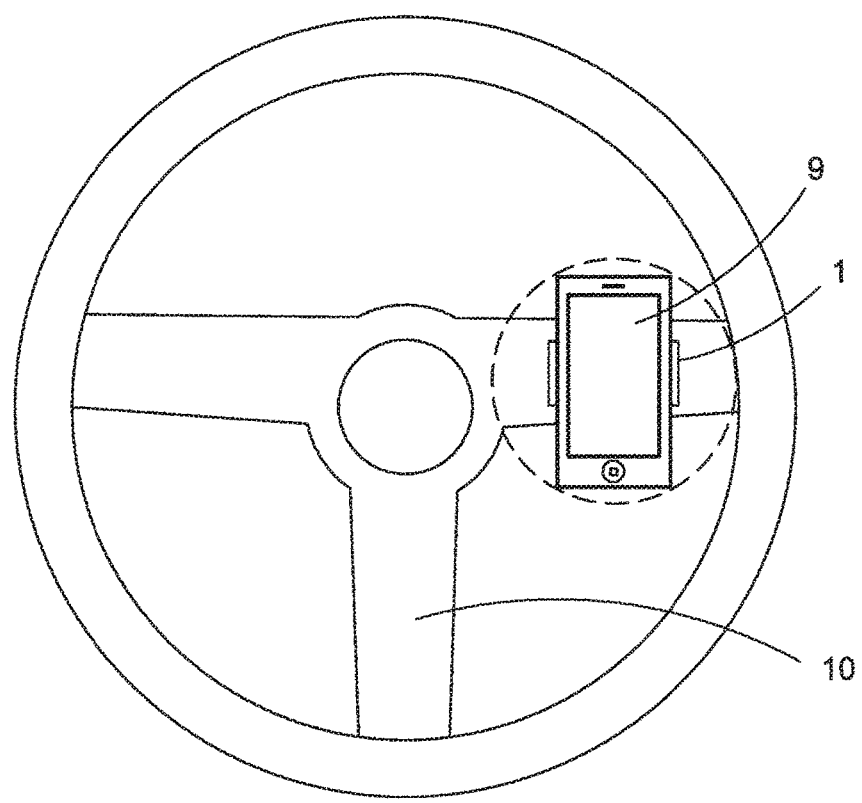
FIG. 2 is a front view of another conventional mounting assembly.
Figure 3A:
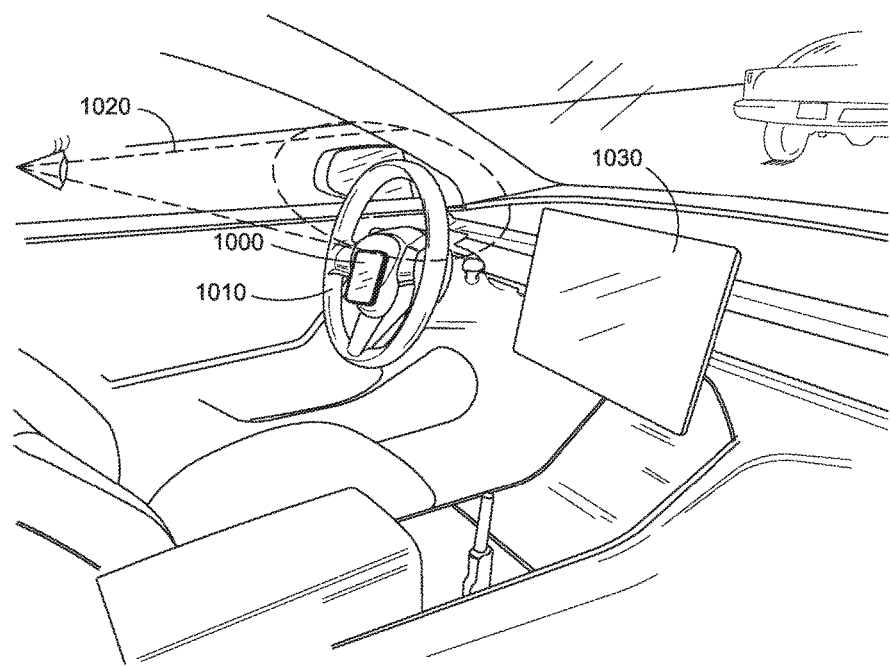
FIG. 3A is a perspective view of an interior of a vehicle with a conventional mounting assembly.
Figure 3B:
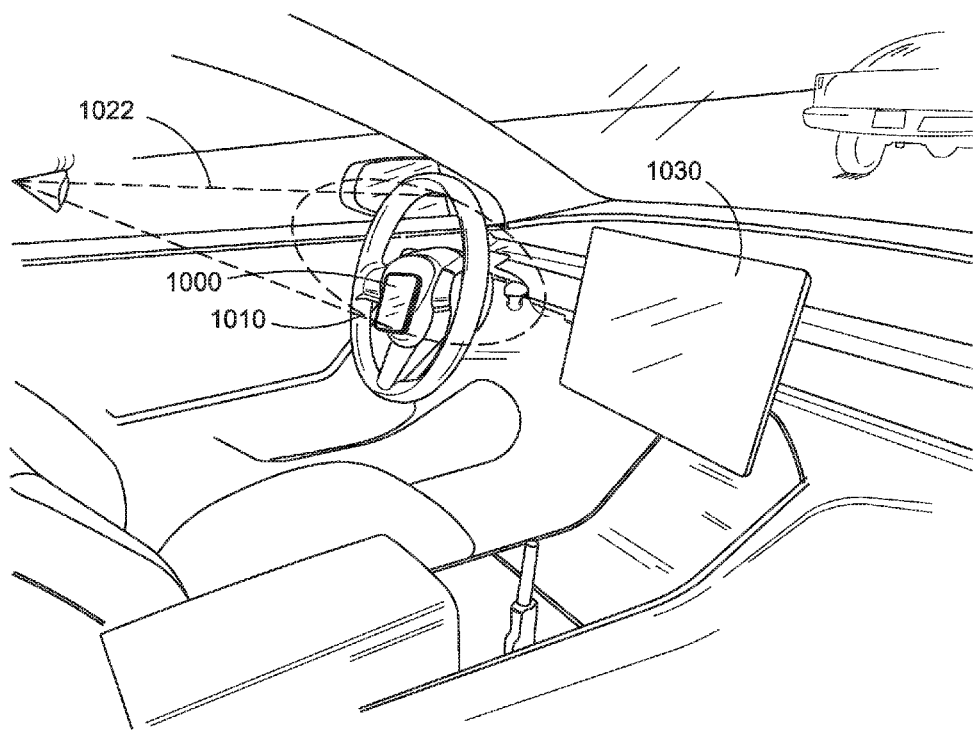
FIG. 3B is another perspective view of the interior of the vehicle with the conventional mounting assembly of FIG. 3A.
Figure 3C:
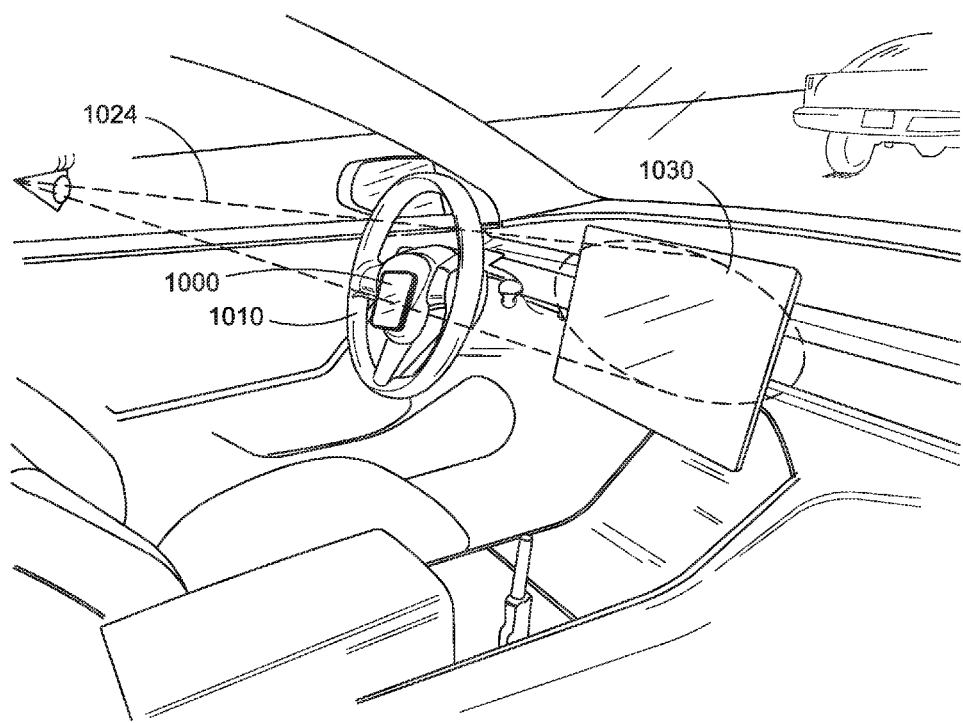
FIG. 3C is another perspective view of the interior of the vehicle with the conventional mounting assembly of FIG. 3A.

For the purposes of illustration only, and not to limit the generality, embodiments of the present disclosure will now be described in detail with reference to the accompanying figures. The present disclosure is not limited in its application to the details of construction and the arrangement of components set forth in the following description or illustrated in the drawings. The present disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Referring to the drawings, and specifically to FIGS. 4, 5, 10A-B, and 15A-B, a steering wheel assembly 10 is depicted as having an electronic device 100 (e.g., cell phones, smartphones, tablets, phablets, cameras, computers, global positioning system (GPS) devices, music players, etc., hereinafter generally referred to as "device(s)") attached to a center console 12 of the steering wheel assembly 10 via a mounting assembly 50. In particular, the electronic device 100 is attached to a front face of an airbag assembly 14 of the center console 12 of the steering wheel assembly 10 via the mounting assembly 50. In the present exemplary embodiment, the electronic device 100 is attached to the steering wheel assembly 10 in a "high" position. As will be discussed in more detail below, the mounting assembly 50 generally includes a safety strap 60 (example of restraining leash), a mounting stud assembly 70, a clip 90, and a stabilizing wand 200.

Figure 6A:
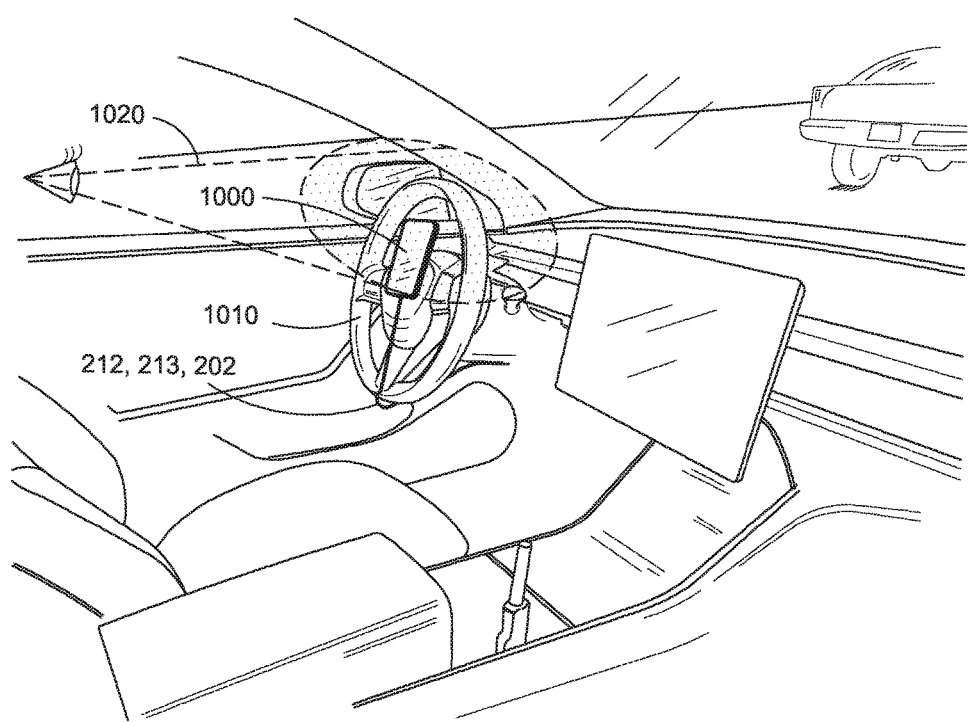
FIG. 6A is a perspective view of an interior of a vehicle with the mounting assembly of FIG. 4.
Figure 6B:
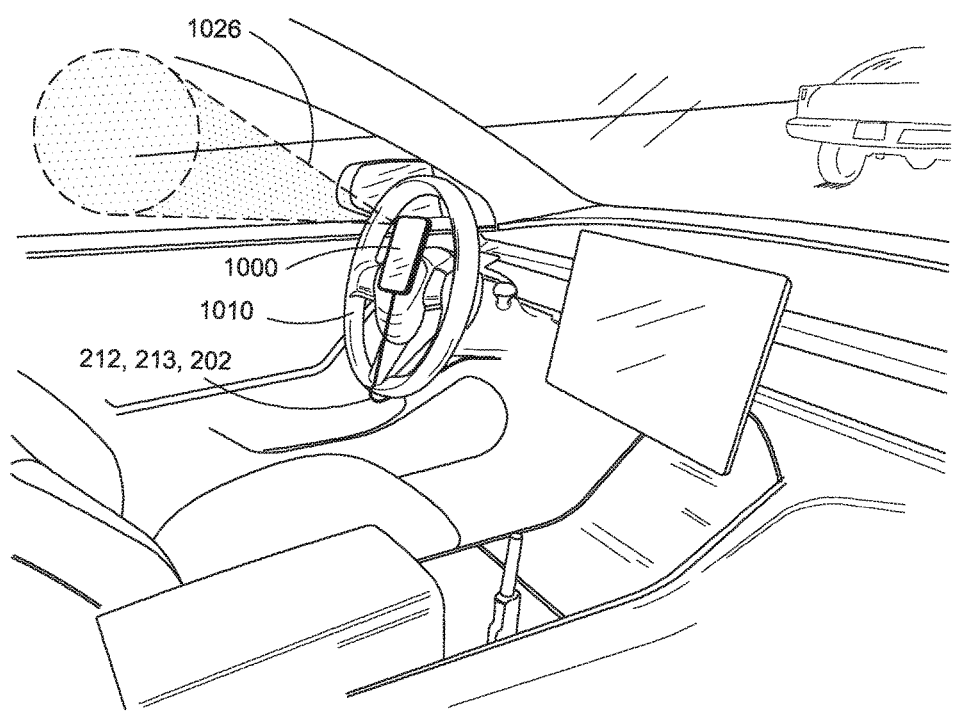
FIG. 6B is a perspective view of an interior of a vehicle with the mounting assembly of FIG. 4.
Figure 6C:
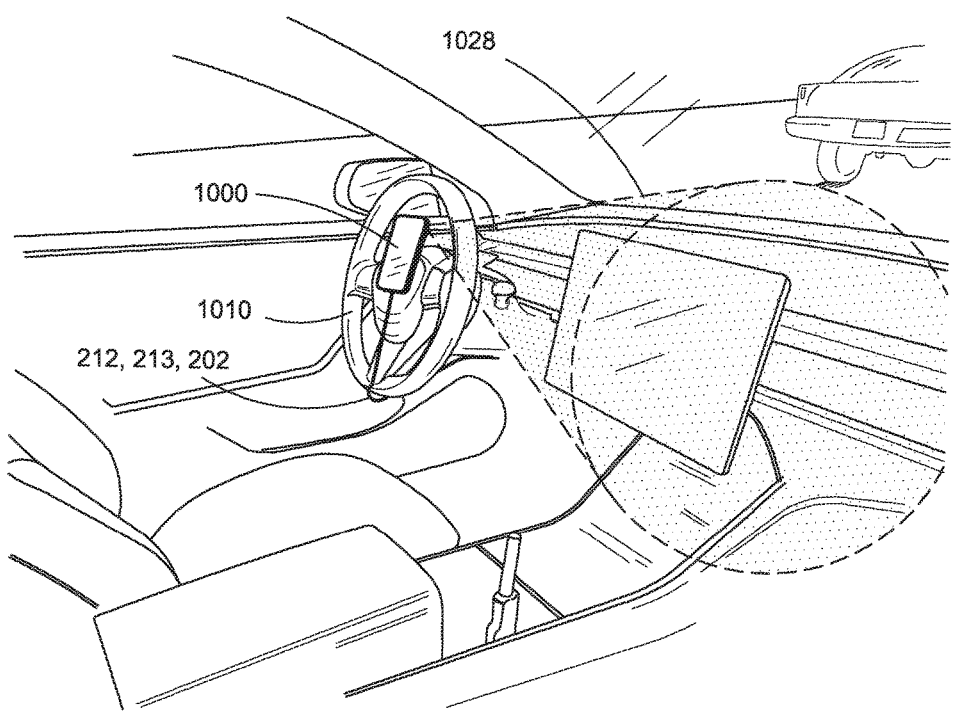
FIG. 6C is a perspective view of an interior of a vehicle with the mounting assembly of FIG. 4.

As shown in FIG. 6A, with the electronic device 100 attached to the steering wheel assembly 10 in the "high" position, the electronic device 100 is located completely, or substantially, within a safe driving line of sight 1020. As a result, the driver does not have to divert his or her eyes from the road in order to observe the electronic device 100. Accordingly, information about the vehicle (speedometer, tachometer, odometer, fuel gauge, temperature gauge, travel direction, etc.) may be provided to the electronic device 100 within a safe driving line of sight 1020. Further, because the electronic device 100 is attached to the steering wheel assembly 10 in the "high" position, the electronic device 100 has a center-of-gravity located above the mounting assembly 50. As a result, the electronic device 100 will naturally tend to rotate about the mounting assembly 50 in addition to other inadvertent rotations or movements that might occur to the electronic device 100 as the result of: (1) static friction between the electronic device 100 and the mounting assembly 50 and/or between components of the mounting assembly 50; (2) the inertia of the electronic device 100; (3) inadvertent contact with the electronic device 100; etc.

Figure 4:
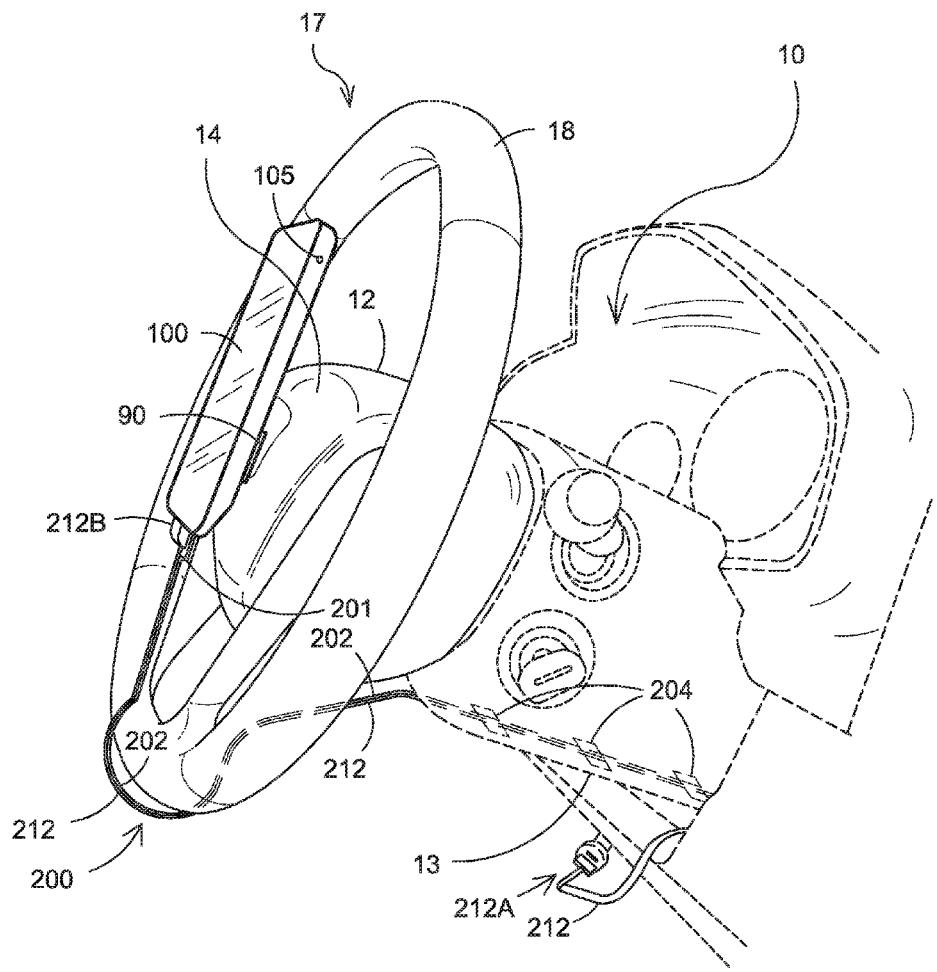
FIG. 4 is a perspective view of a steering wheel assembly showing an electronic device mounted thereon via a mounting assembly in accordance with an exemplary embodiment.
Figure 5:
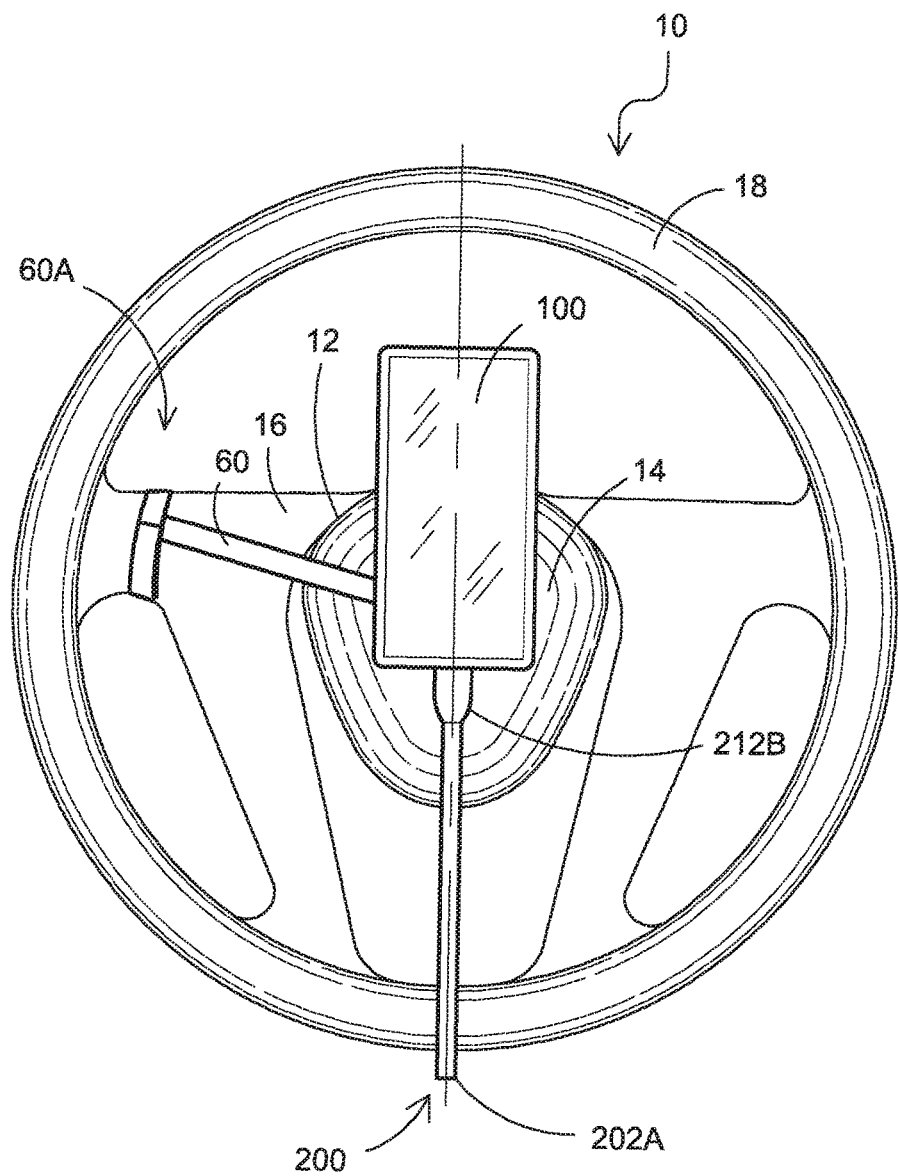
FIG. 5 is a front view of the steering wheel assembly and mounting assembly of FIG. 4.
Figures 7, 8:
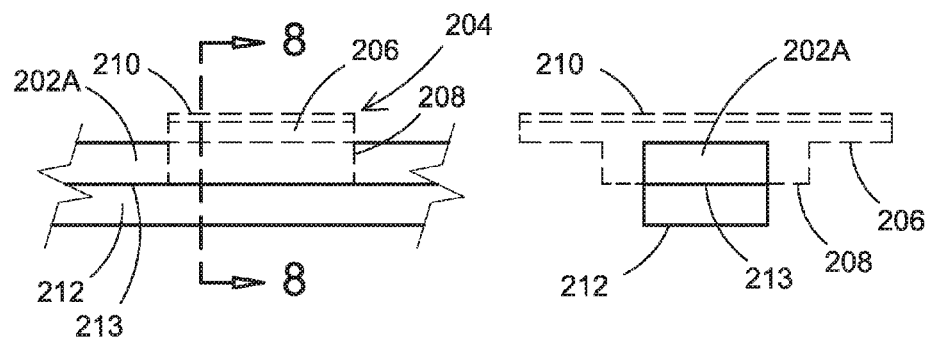
FIG. 7 is a detailed cross-sectional side view of a stabilizing member of the mounting assembly of FIG. 4.
FIG. 8 is a detailed cross-sectional front view of the stabilizing member of the mounting assembly of FIG. 4 taken along line 8-8 of FIG. 7.
Figure 9:
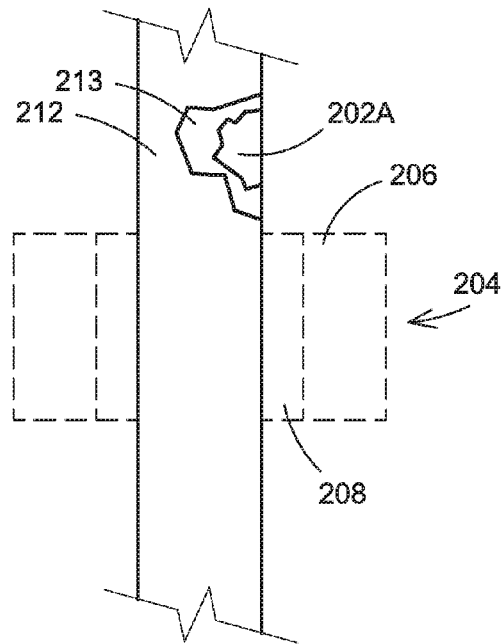
FIG. 9 is a detailed bottom view of the stabilizing member of the mounting assembly of FIG. 4.
Figure 11:
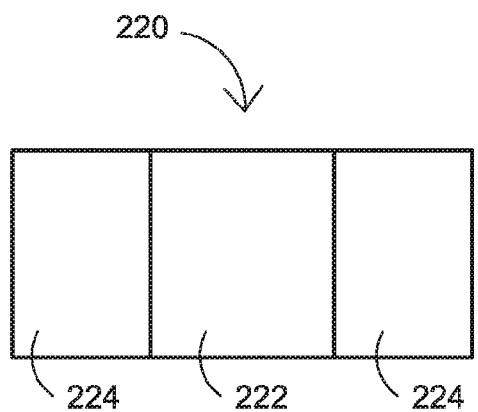
FIG. 11 is a detailed top view of a bracket of the mounting assembly of FIG. 4.
Figure 12:
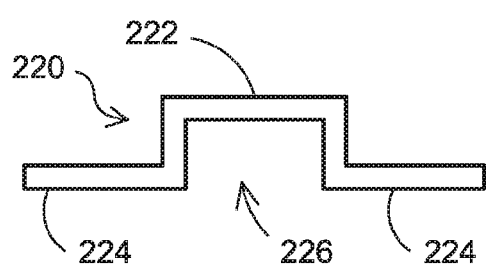
FIG. 12 is a detailed side view of a bracket of the mounting assembly of FIG. 4.
Figure 13:
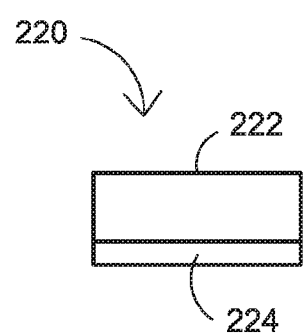
FIG. 13 is a detailed side view of a bracket of the mounting assembly of FIG. 4.
Figure 14:
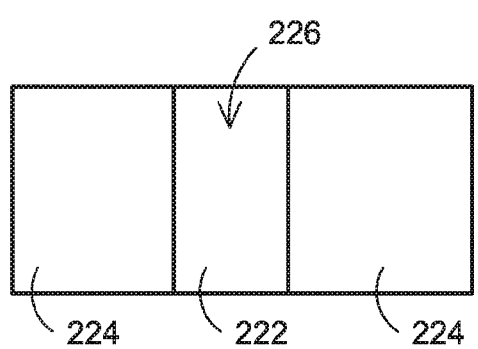
FIG. 14 is a detailed bottom view of a bracket of the mounting assembly of FIG. 4.
Figure 15:
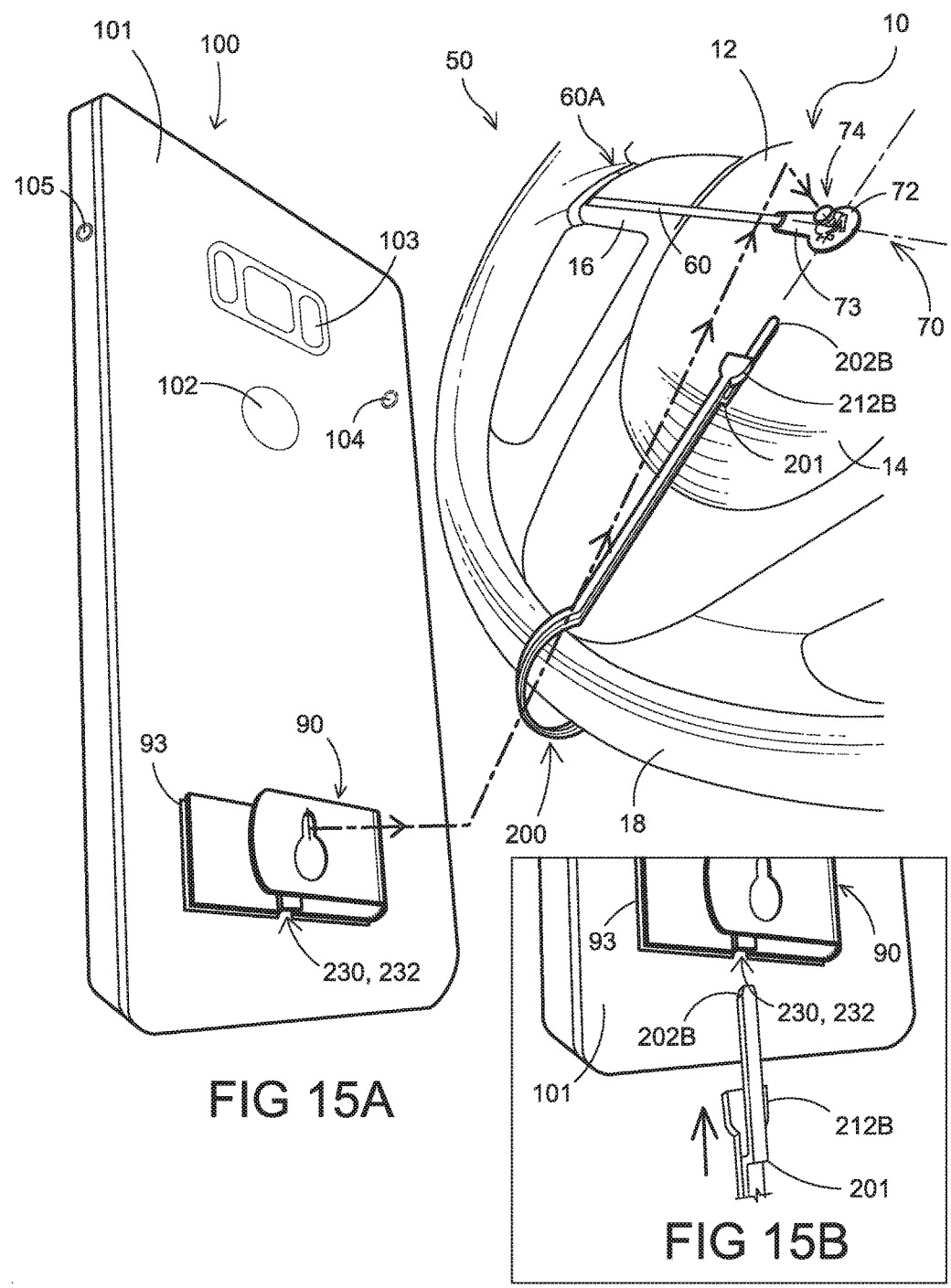
FIG. 15A is an exploded perspective view of the steering wheel assembly and mounting assembly of FIG. 4.
FIG. 15B is a perspective view showing a support member being mounted to bracket of the mounting assembly of FIG. 15A.

In order to prevent such rotation or movement, the stabilizing wand 200 may be provided to prevent rotation or movement of the electronic device 100. The stabilizing wand 200 includes a support member 202 and one or more support clips 204. The support member 202 may be rigid or semi-rigid and may be formed of any appropriate material or materials including plastic, metal, etc. As shown in FIG. 4, although it is not necessary, the support member 202 may be formed to have a profile that corresponds to (i.e., mimics, except for being slightly larger than) a profile of the steering wheel assembly 10. In this manner, the user may be less likely to inadvertently contact the support member 202. As shown in FIGS. 7-9, the support member 202 may be formed to have a rectangular cross-sectional profile although any other appropriate shape may be used.

Also as shown in FIGS. 7-9, each of the support clips 204 includes a base 206 and a pair of resilient clamping arms 208. As best seen in FIGS. 8 and 9, the resilient clamping arms 208 are configured to selectively or resiliently clamp (i.e., by interference fit or friction fit), so as to hold, the support member 202. Thus, it should be appreciated that the support clips 204 are selectively coupleable to, and decoupleable from, the support member 202. Also as shown in FIG. 4, the support clips 204 are attached to an exterior surface of the center console 12, preferably on its bottom surface at 13, of the steering wheel assembly 10 via an adhesive 210 (e.g., double-sided tape, hook-and-loop tape, glue, etc.). Thus, a first end 202A of the support member 202 may be attached to the center console 12 of the steering wheel assembly 10 via the support clips 204. As a result, the first end 202A of the support member 202 may be secured to the steering wheel assembly 10.

It should be appreciated that although the support member 202 is depicted in FIG. 4 as being attached to a bottom surface of the center console 12, the support member 202 may be additionally or alternatively attached to any appropriate surface of the center console 12. Further, although the support member 202 is depicted in FIG. 4 as being attached to the center console 12, the support member 202 may be additionally or alternatively attached to any stationary portion of the steering wheel assembly 10 or any other stationary portion of the vehicle.

Furthermore, with the electronic device 100 attached to the steering wheel assembly 10 via the mounting assembly 50, a second end 202B of the of the support member 202 may be attached to the electronic device 100. For example, as shown in FIGS. 10A and 10B, a bracket 220 may be attached to a backside of the electronic device 100 beneath the clip 90 (described in more detail below). As best seen in FIGS. 11-14, the bracket 220 comprises a U-shaped center portion 222 and a pair of flange portions 224 projecting from opposite sides of the center portion 222. The center portion 222 defines a slot 226 sized and shaped to receive the second end 202B of the support member 202. In particular, as shown in FIGS. 10A and 10B, with the flange portions 224 of the bracket 220 attached to the backside of the electronic device 100 via an adhesive 213 (e.g., double-sided tape, hook-and-loop tape, glue, etc.), the slot 226 and the backside of the electronic device 100 define a passageway 228 into which the second end 202B of the support member 202 may be received. It should be appreciated that the slot 226, and thus the passageway 228, may be sized and shaped so as to couple with the second end 202B of the support member 202 through interference fit or friction fit, although such a connection need not be provided. Finally, the second end 202B of the support member 202 may be provided with one or more protrusions (not shown) configured to limit the depth to which second end 202B of the support member 202 may be received within the passageway 228.

Thus, it should be appreciated that, with the support member 202 attached to the steering wheel assembly 10 via the support clips 204, the support member 202 will prevent rotation or movement of the electronic device 100 as a result of the rigidity or semi-rigidity of the support member 202. As a result, the electronic device 100 may be attached to the steering wheel assembly 10 in the "high" position, a steering wheel 17 may be rotated, and the vehicle may be turned, without causing rotation or movement to the electronic device 100.

In some embodiments the bracket 220 may be integrated into the clip 90 (described in more detail below). In particular, as shown in FIG. 15A-B, the clip 90 may be shaped so as to define a slot 230 sized and shaped to receive the second end 202B of the support member 202. As a result, with the clip 90 attached to the backside of the electronic device 100 via an adhesive 93 (e.g., double-sided tape, hook-and-loop tape, glue, etc.), the slot 230 and the backside of the electronic device 100 define a passageway 232 into which the second end 202B of the support member 202 may be received. Accordingly, it should be appreciated that in such embodiments, there is no need to provide the bracket 220 as a separate component thereby decreasing the total number of components. It should also be appreciated that as with the slot 226, the slot 230, and thus the passageway 232, may be sized and shaped so as to couple with the second end 202B of the support member 202 through interference fit or friction fit, although such a connection need not be provided.

Figure 16:
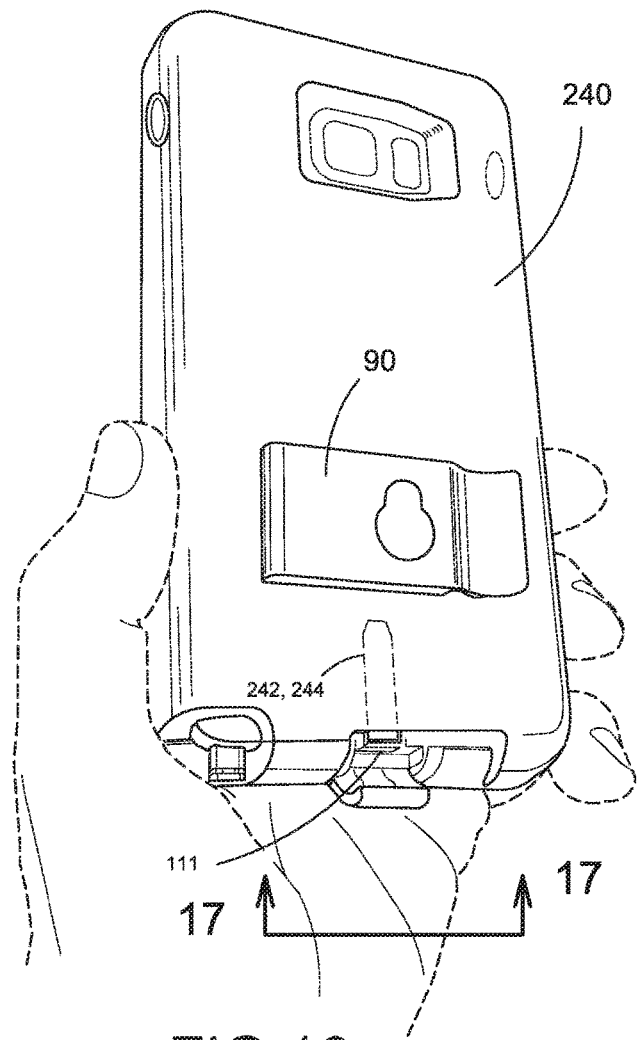
FIG. 16 is a perspective view of the electronic device for use with the mounting assembly of FIG. 4 having a protective case.
Figure 17:
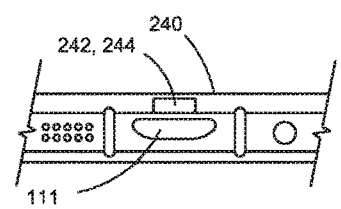
FIG. 17 is a bottom view of the electronic device of FIG. 16.
Figure 18B:
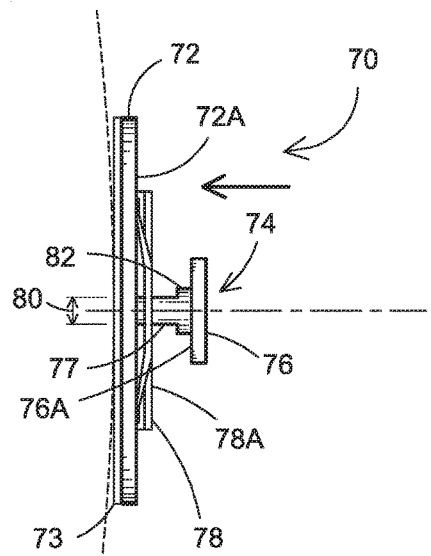
Figure 18C:
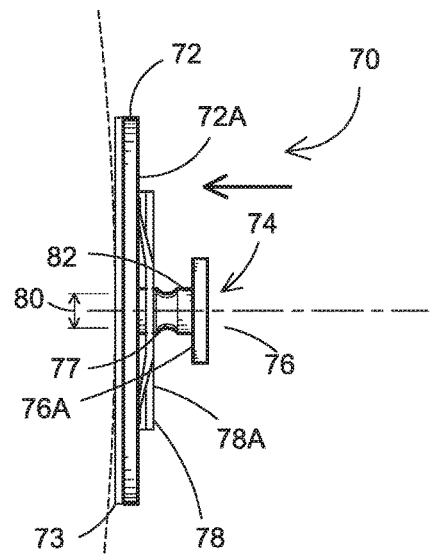
Figure 20B:
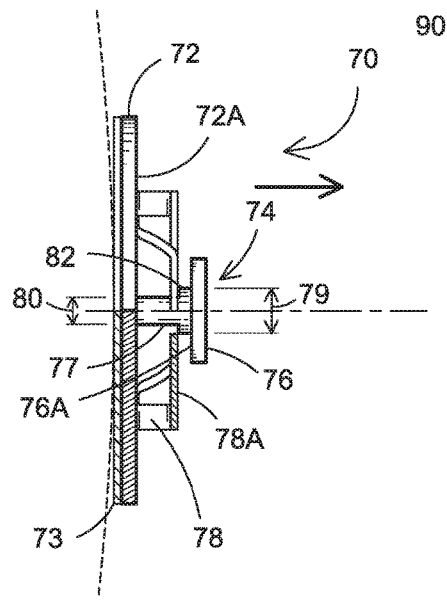
Figure 20C:
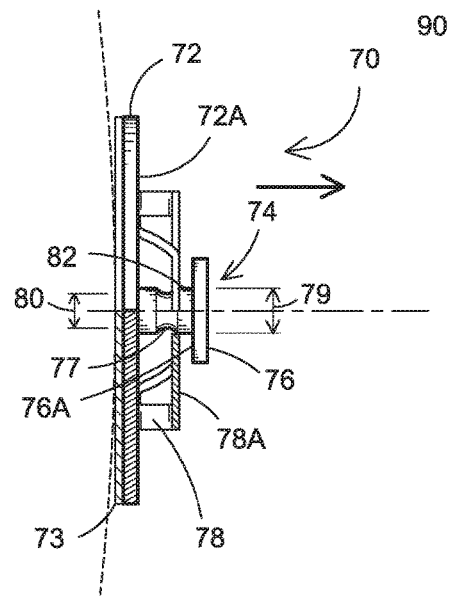
Figure 18D:
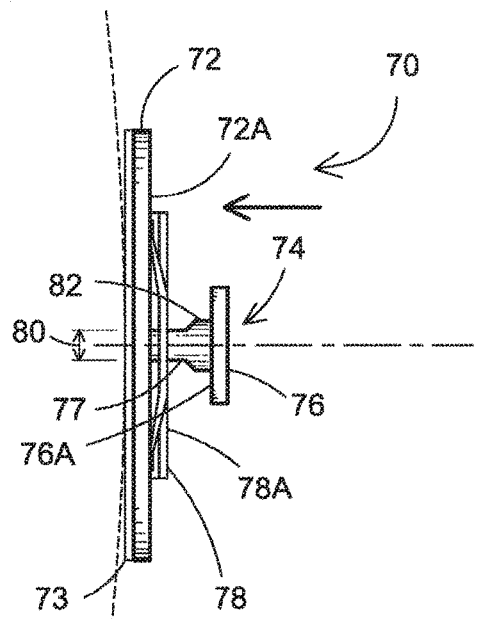
Figure 20D:
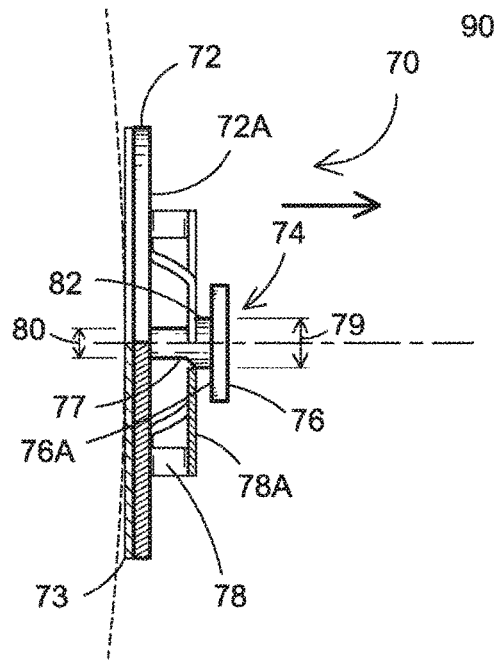

In some embodiments the bracket 220 may be integrated into a case 240 of the electronic device 100. In particular, as shown in FIGS. 16 and 17, an interior surface of the case may be shaped so as to define a slot 242 sized and shaped to receive the second end 202B of the support member 202. As a result, with the electronic device 100 secured within the case 240, the slot 242 and the backside of the electronic device 100 define a passageway 244 into which the second end 202B of the support member 202 may be received. Accordingly, it should be appreciated that in such embodiments, there is no need to provide the bracket 220 as a separate component thereby decreasing the total number of components. It should also be appreciated that as with the slots 226, 230, the slot 242, and thus the passageway 244, may be sized and shaped so as to couple with the second end 202B of the support member 202 through interference fit or friction fit, although such a connection need not be provided. As will be appreciated from the disclosure below, the passageway 244 may advantageously be located adjacent to a charging port 111 of the electronic device 100.

Returning to FIGS. 4 and 7-9, In some embodiments, the stabilizing wand 200 may include a power cord (i.e., charging cable) 212. As shown in FIG. 4, a first end 212A of the power cord 212 may be electrically connected to a power source (e.g., a battery of the vehicle). Further, a second end 212B of the power cord 212 may be electrically connected to the electronic device 100 such that the electronic device 100 may be charged via the power source. As shown in FIG. 10B, a dog leg portion 201 is provided between the second end 202B of the support member 200 and the second end 212B of the power cord 212. The dog leg portion allows the second end 202B of the support member 200 to be aligned with the bracket while the second end 212B power cord 212 is aligned with a port of the electronic device 100. As shown in FIGS. 7-9 an intermediate portion of the power cord 212 (i.e., a portion of the power cord 212 between the first end 212A and the second end 212B) may be attached to a surface of the support member 202 via an adhesive 213 (e.g., double-sided tape, hook-and-loop tape, glue, etc.). Alternatively, the power cord 212 may be integrally and continuously attached to or provided so as to extend through the support member 202. It should be appreciated that with the support member 202 attached to the support member 202, the user may be less likely to inadvertent contact the power cord 212. Alternatively, the stabilizing wand 200 may include a data cord (not shown) that transmits data between the electronic device 100 and an electronic system of the vehicle.

As previously mentioned, in addition to the stabilizing wand 200, the mounting assembly 50 also includes the safety strap 60, the mounting stud assembly 70, and the clip 90. As shown in FIGS. 5, 10A-B, and 15A-B, a first end 60A of the safety strap 60 is secured to a cross member 16 of the steering wheel 17 of the steering wheel assembly 10. It should be appreciated, however, that the first end 60A of the safety strap 60 may additionally or alternatively be secured to a rim 18 of the steering wheel 17 of the steering wheel assembly 10. As shown in FIGS. 10A-B, 15A-B, and 19, a second end 60B of the safety strap 60 is secured to a tab 73 of a base 72 of the mounting stud assembly 70 via an opening 75 formed in the tab 73. As such, it should be appreciated that the mounting stud assembly 70 is indirectly attached to the steering wheel assembly 10 via the safety strap 60. Thus, as will be described in more detail below, even if the mounting stud assembly 70 is not itself directly attached to the steering wheel assembly 10, the mounting stud assembly 70 will nevertheless remain attached to the steering wheel assembly 10 via the safety strap 60. In some embodiments, a length of the safety strap 60 may be adjustable so as to accommodate differently sized steering wheel assemblies.

As shown in FIGS. 10A-B, 15A-B, 18A-D, and 20A-D, the base 72 of the mounting stud assembly 70 is directly attached to the airbag assembly 14 of the steering wheel assembly 10 via an adhesive 73 (e.g., double-sided tape, hook-and-loop tape, glue, etc.). Thus, it should be appreciated that the mounting stud assembly 70 is both directly and indirectly attached to the steering wheel assembly 10.

The mounting stud assembly 70 includes the base 72, a stud shaft 74, a stud head 76, and a biasing member 78 (e.g., a finger spring washer, a disc spring, a wave spring, etc.). As best seen in FIGS. 18A-D and 20A-D, the stud shaft 74 protrudes from a center position of a front surface 72A of the base 72. Further, the base 72 is attached to the airbag assembly 14 of the steering wheel assembly 10 at an axial center of the steering wheel assembly 10 such that the stud shaft 74 extends collinearly along an axis of the center console 12 (i.e., an axis of rotation of the steering wheel 17). Thus, it should be appreciated that as the steering wheel assembly 10 rotates about its axis, the mounting stud assembly 70 rotates concurrently therewith about the stud shaft 74.

Also as best seen in FIGS. 18A-D and 20A-D, the stud head 76 is disposed at an end of the stud shaft 74 opposite the base 72, and projects radially outward therefrom such that an outer diameter of the stud head 76 is larger than an outer diameter 79 of the stud shaft 74. It should be appreciated that the base 72, the stud shaft 74, and the stud head 76 may be formed as a single, integral and continuous component via molding, additive manufacturing (i.e., 3D printing), etc. Alternatively, one or all of the base 72, the stud shaft 74, and the stud head 76 may be individually manufactured and subsequently assembled so as to attached to one another.

The biasing member 78 is ring-shaped and includes a central opening. The biasing member 78 is disposed on the stud shaft 74 via the central opening of the biasing member 78. An inner diameter of the central opening of the biasing member 78 is sized to accommodate movement of the biasing member 78 along a length of the stud shaft 74. That is, the inner diameter of the central opening of the biasing member 78 is larger than the outer diameter 79 of the stud shaft 74. As shown in FIGS. 18A-D and 20A-D, the biasing member 78 is disposed between the base 72 and the stud 76 and, as will be described in more detail below, is configured to bear against the front surface 72A of the base 72.

As shown in FIGS. 18A-D and 20A-D, the stud shaft 74 is generally cylindrical. An intermediate portion 77 of the stud shaft 74 is, however, "keyed" (or notched). Specifically, the intermediate portion 77 of the stud shaft 74 includes a planar cut out (or notch) provided in a side surface of the stud shaft 74. As a result, a width 80 of stud shaft 74 at the intermediate portion 77 (taken perpendicular to the face of the planar cut out), is less than the outer diameter 79 of the stud shaft 74. The intermediate portion 77 may extend along an appropriation length of the stud shaft 74. For example, as shown in FIGS. 18A-D and 20A-D, the intermediate portion 77 may extend from the base 72 to a position near to, yet spaced apart from, a back surface 76A of the stud head 76. As will be appreciated from the description below, the intermediate portion 77 may be spaced apart from the back surface 76A of the stud head 76 by a length corresponding to, or greater than, a width of the clip 90 so as to ensure that the clip 90 remains disposed about a distal portion 82 of the stud shaft 74 having the outer diameter 79.

It should be appreciated that in some embodiments, the central opening of the biasing member 78 may be shaped to correspond to (i.e., mimic, except for being slightly larger than) the cross-sectional shape of the intermediate portion 77 (i.e., a circle with a flat side). In this manner, movement of the biasing member 78 along a length of the stud shaft 74 may be limited to movement along a length of the intermediate portion 77. That is, if the central opening of the biasing member 78 is shaped to correspond to the cross-sectional shape of the intermediate portion 77, the biasing member 78 will necessarily bear against opposing lengthwise interior surfaces of the intermediate portion 77 thereby limiting movement of the biasing member 78 along the length of the intermediate portion 77.

As shown in FIGS. 21 and 22, the clip 90 is generally U-shaped and includes a front plate member 92 and a back plate member 94. As shown in FIGS. 10A-B, 15A-B and 16, the back plate member 94 is directly attached to a back surface 101 of the electronic device 100 via the adhesive 93 (e.g., double-sided tape, hook-and-loop tape, glue, etc.). In particular, the clip 90 is attached to a lower portion of the back surface 101 of the electronic device 100 such that the electronic device 100 may be attached to the steering wheel assembly 10 in the "high" position. The front plate member 92 is spaced apart from the back plate member 94 so as to provide a space therebetween. As will be described in more detail below, a user may attach the clip 90 to a number of different objects via this space.

In a preferred embodiment, the front plate member 92 includes an opening 98 formed therethrough. The opening 98 is formed by a first circular opening 98A and a second circular opening 98B which overlap one another (although the first circular opening 98A and the second circular opening 98B are described as being circular, it should be appreciated that any appropriate shape may be used (e.g., square, oval, etc.)). As shown in FIG. 21, the first circular opening 98A has an inner diameter larger than an inner diameter of the second circular opening 98B. Further, the inner diameter of the first circular opening 98A is larger than the outer diameter of the stud head 76 such that the stud head 76 may be pass through the front plate member 92 via the first circular opening 98A. The inner diameter of the second circular opening 98B on the other hand, is smaller than the outer diameter of the stud head 76 but larger than the outer diameter 79 of the stud shaft 74 such that the second circular opening 98B may receive the stud shaft 74 but not the stud head 76. The second circular opening 98B, however, overlaps the first circular opening 98A such that a chord length 95, defined by an opening between the first circular opening 98A and the second circular opening 98B, is smaller than the outer diameter 79 of the stud shaft 74 but larger than the width 80 of the intermediate portion 77 such that only the intermediate portion 77 of the stud shaft 74 may be passed from the first circular opening 98A to the second circular opening 98B. In this manner, as will be described in more detail below, the clip 90, and thus the electronic device 100, may be effectively "locked" to the mounting stud assembly 70. It should be appreciated, however, that although the electronic device 100, may be effectively "locked" to the mounting stud assembly 70, the stud shaft 74 may nevertheless freewheelingly rotate inside the clip opening 98B.

An exemplary method of "locking" the electronic device 100 to the mounting stud assembly 70 will now be described. First, with the electronic device 100 in an upright position, and with the clip 90 attached to the electronic device 100, the user passes the clip 90 over the stud head 76 and the stud shaft 74 via the first circular opening 98A such that the stud head 76 is received within the interior space of the clip 90 and such that the stud shaft 74 is positioned within the first circular opening 98A. The clip 90 is passed over the stud shaft 74 until the front plate member 92 of the clip 90 contacts a front surface 78A of the biasing member 78, with the biasing member 78 in a decompressed position (FIG. 20A-D). With the clip 90 in this position, it should be appreciated that the stud shaft 74 may not be moved into the second circular opening 98B because the chord length 95, defined by the opening between the first circular opening 98A and the second circular opening 98B, is smaller than the outer diameter 79 of the stud shaft 74.

Figure 23A:
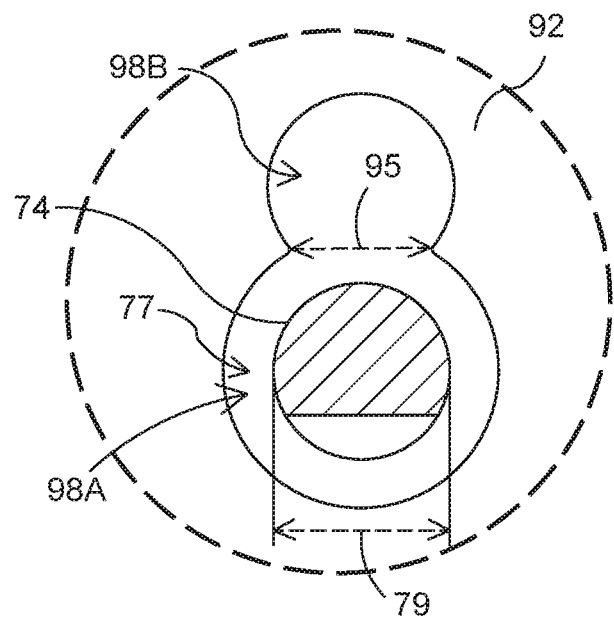
FIGS. 23A-23E depict detailed cross-sectional front views of the clip of FIG. 21 being "locked" to the mounting assembly of FIG. 4.

Next, with the electronic device 100 remaining in the upright position, the user continues to advance the electronic device 100 so as to further pass the clip 90 over the stud shaft 74 until the intermediate portion 77 of the stud shaft 74 is received within the first circular opening 98A as shown in FIG. 23A. This is accomplished by overcoming the opposing force of the biasing member 78. Importantly, as shown in FIG. 9A, with the electronic device 100 in the upright position, the second circular opening 98B is located above the first circular opening 98A and the stud shaft 74 is oriented such that the chord length 95 is substantially parallel to the outer diameter 79 of the stud shaft 74. Again, with the clip 90 in this position, it should be appreciated that the stud shaft 74 may not be moved into the second circular opening 98B because the chord length 95 is smaller than the outer diameter 79 of the stud shaft 74.

Figure 23B:
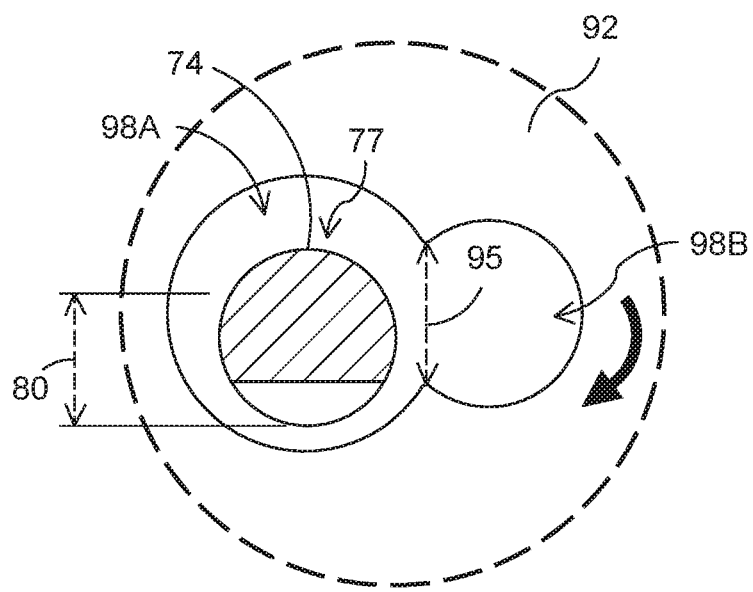
Figure 23C:
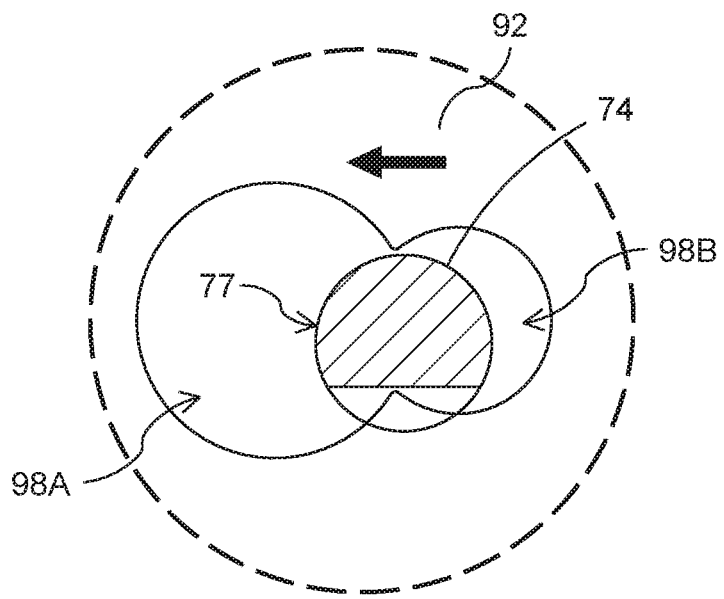
Figure 23D:
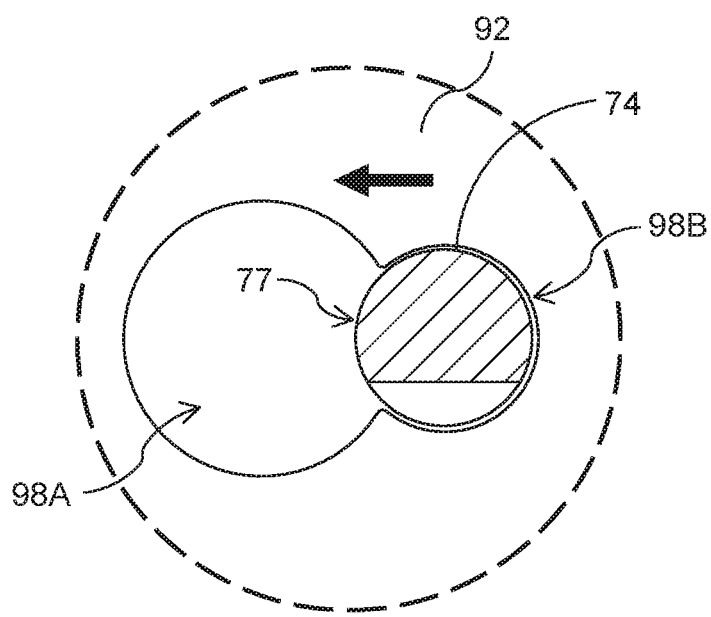

Then, as the lengthwise (i.e., axial) position of the clip 90 is maintained (or advanced further) such that the intermediate portion 77 of the stud shaft 74 remains within the first circular opening 98A, the electronic device 100 is rotated from the upright position into a horizontal position so as to rotate the clip 90 as shown in FIG. 23B. Importantly, as shown in FIG. 23B, with the electronic device 100 in the horizontal position, the second circular opening 98B is located to the side of the first circular opening 98A and the stud shaft 74 is oriented such that the chord length 95 is substantially parallel to the width 80 of the intermediate portion 77. Thus, it should be appreciated that in this position, the stud shaft 74 may be passed from the first circular opening 98A to the second circular opening 98B because the chord length 95 is larger than the width 80 of the intermediate portion 77. Then, as shown in FIG. 23C, the electronic device 100 is moved in a widthwise (i.e., radial) direction such that the intermediate portion 77 of the stud shaft 74 passes through the area of the chord length 95 and is moved into, and received within, the second circular opening 98B as shown in FIG. 23D.

Figure 23E:
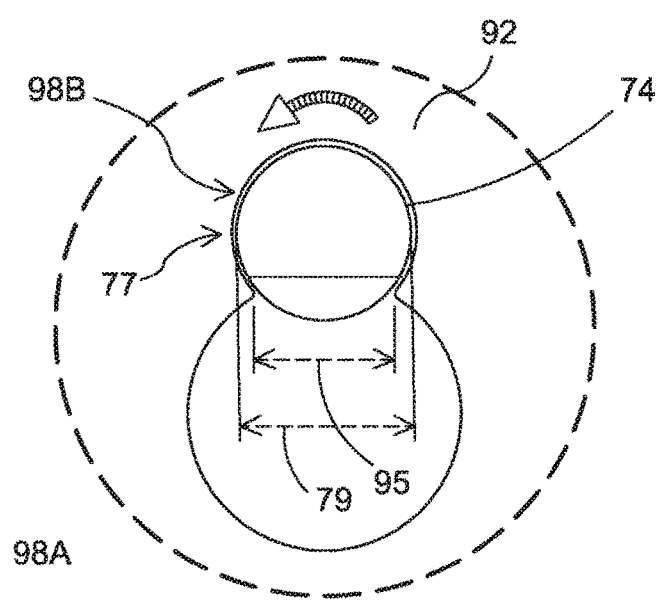

Next, the user rotates the electronic device 100 (or releases the electronic device 100 and allows it to rotate on its own) from the horizontal position back into the upright position so as to rotate the clip 90 as shown in FIG. 23E. Again, as shown in FIG. 23E, with the electronic device 100 in the upright position, the second circular opening 98B is arranged above the first circular opening 98A and the stud shaft 74 is oriented such that the chord length 95 is substantially parallel to the outer diameter 79 of the stud shaft 74. Significantly, with the clip 90 in this position, it should be appreciated that the stud shaft 74 may not be removed from the second circular opening 98B because the chord length 95 is smaller than the outer diameter 79 of the stud shaft 74. Thus, the stud shaft 74 is effectively "locked" within the second circular opening 98B.

Finally, the user releases the electronic device 100, and thus the clip 90, so as to no longer overcome the opposing force of the biasing member 78. As a result of the opposing force of the biasing member 78, the front plate member 92 of the clip 90 is forced toward the back surface 76A of the stud head 76. In particular, the opposing force of the biasing member 78 may force the front plate member 92 of the clip 90 against the back surface 76A of the stud head 76 such that the front plate member 92 of the clip 90 is "pinched" between the biasing member 78 and the stud head 76. In this manner, the lengthwise position of the clip 90 may be maintained by opposing forces from the biasing member 78 and the stud head 76. It should be appreciated, however, that although the front plate member 92 of the clip 90 is "pinched" between the biasing member 78 and the stud head 76, the stud shaft 74 nevertheless remains sufficiently free to freewheelingly rotate inside the clip opening 98B.

As a result of the clip 90 being retracted toward the stud head 76, the intermediate portion 77 of the stud shaft 74 exits the second circular opening 98B and the distal portion 82 of the stud shaft 74 having the outer diameter 79 is received within the second circular opening 98B. It should be appreciated that because the chord length 95, defining the opening between the first circular opening 98A and the second circular opening 98B, is smaller than the outer diameter 79 of the stud shaft 74, the stud shaft 74 may not be passed back into the first circular opening 98A with the clip 90 in this lengthwise position. As a result, the electronic device 100, is effectively "locked" to the mounting stud assembly 70 and thus to the steering wheel assembly 10.

With the electronic device 100 "locked" to the mounting stud assembly 70 the electronic device 100 is less likely to become disconnected from the mounting stud assembly 70. As such, the driver is less likely to be distracted and safety can be improved. Further, because the mounting stud assembly 70 is attached to the steering wheel assembly 10 via the safety strap 60, if the airbag assembly 14 is deployed, the electronic device 100 may nevertheless remain attached to the steering wheel assembly 10 via the safety strap 60 so as to limit the chances of the electronic device 100 becoming a dangerous projectile as it might otherwise if detached from the steering wheel assembly 10.

To "unlock" the electronic device 100 from mounting stud assembly 70, the user must actively overcome the opposing force of the biasing member 78 and perform the above-described steps in reverse order. As a result, of the numerous steps required to "unlock" the electronic device 100, the electronic device 100 is unlikely to become inadvertently "unlocked." As a result, significant advantages in user safety are realized.

It should be appreciated in addition to, or in lieu of, rotating the electronic device 100 relative to the mounting stud assembly 70 in order to "lock" the electronic device 100 to the mounting stud assembly 70 as described above, the mounting stud assembly 70 may be rotated relative to the electronic device 100 in order to "lock" the electronic device 100 to the mounting stud assembly 70 by rotating the steering wheel 17 of the steering wheel assembly 10 while maintaining an orientation of the electronic device 100. In other words, the electronic device 100 need not be rotated to "lock" the electronic device 100 to the mounting stud assembly 70; instead, the steering wheel 17 may be rotated if the user wishes.

It should be appreciated that in some embodiments of the clip 90, the clip 90 may be provided with one or more resilient protuberances formed in the area of the chord length 95 so as to further prevent inadvertent removal of the stud shaft 74 from the second circular opening 98B. In addition, such protuberances may provide tactile and/or audible feedback to the user so as to indicate that the stud shaft 74 has been moved into, or removed from, the second circular opening 98B. In this manner, the user may be made aware of the stud shaft 74 becoming effectively "locked" or "unlocked."

In some embodiments, the electronic device 100 may include one or more cameras 104 (see FIGS. 6B, 6C, 10, and 15). One or more of the cameras 104 may be located on the back surface of the electronic device 100. In this manner, with the electronic device 100 attached to the steering wheel assembly 10, the cameras 104 may be used to capture images or videos of whatever is occurring in front of the user (e.g., the instrument panel, the view through a windshield, etc.). Additionally or alternatively, one or more of the cameras 104 may be located on opposing side (or top and bottom) surfaces 103 of the electronic device 100. In this manner, with the electronic device 100 attached to the steering wheel assembly 10, the cameras 104 may be used to capture images or videos of whatever is occurring around the user (e.g., the passenger compartment, the view through a driver and passenger window, etc.). Finally, additionally or alternatively, one or more of the cameras 104 may be located on a front surface 106 of the electronic device 100. In this manner, with the electronic device 100 attached to the steering wheel assembly 10, the cameras 104 may be used to capture images or videos of the driver and/or whatever is occurring behind the driver (e.g., the passenger compartment, the view through a rear window, etc.).

Figure 24:
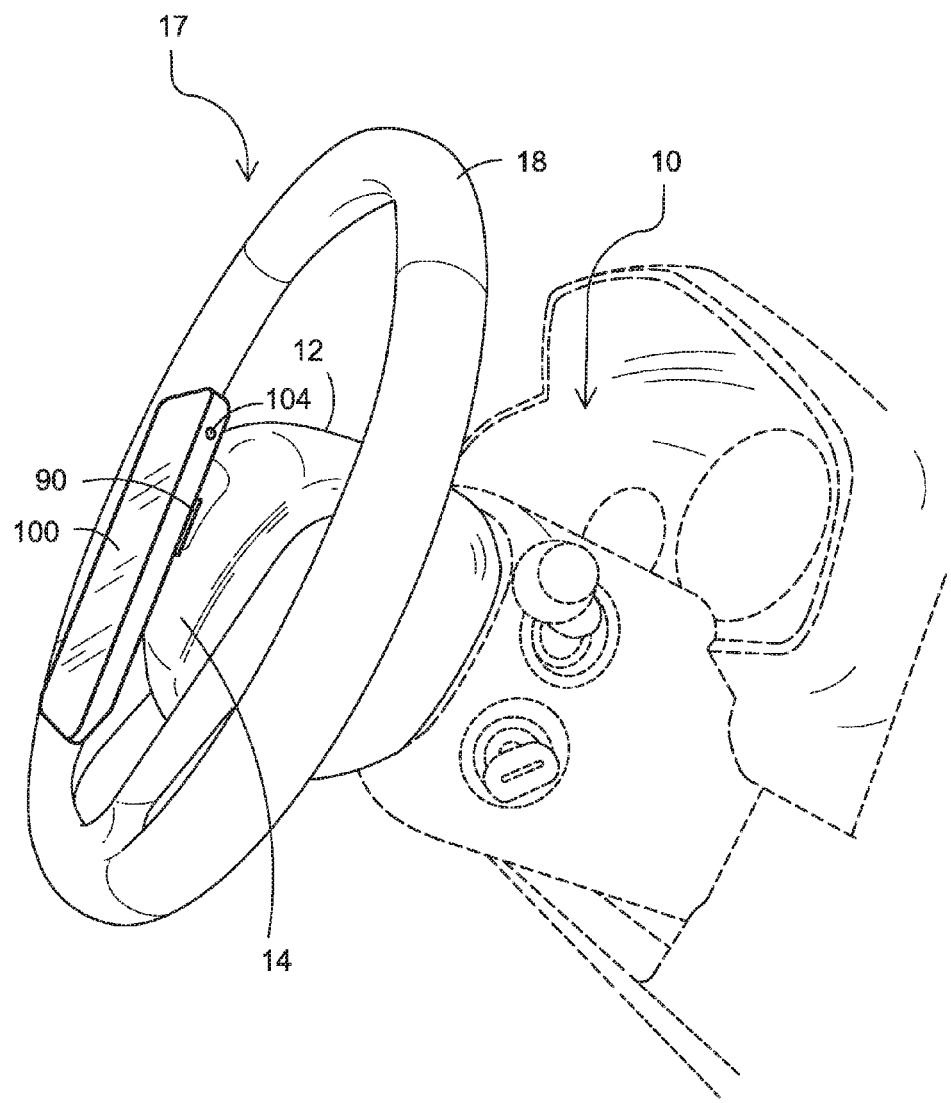
FIG. 24 is a perspective view of a steering wheel assembly showing an electronic device mounted thereon via a mounting assembly in accordance with another exemplary embodiment.
Figure 25:
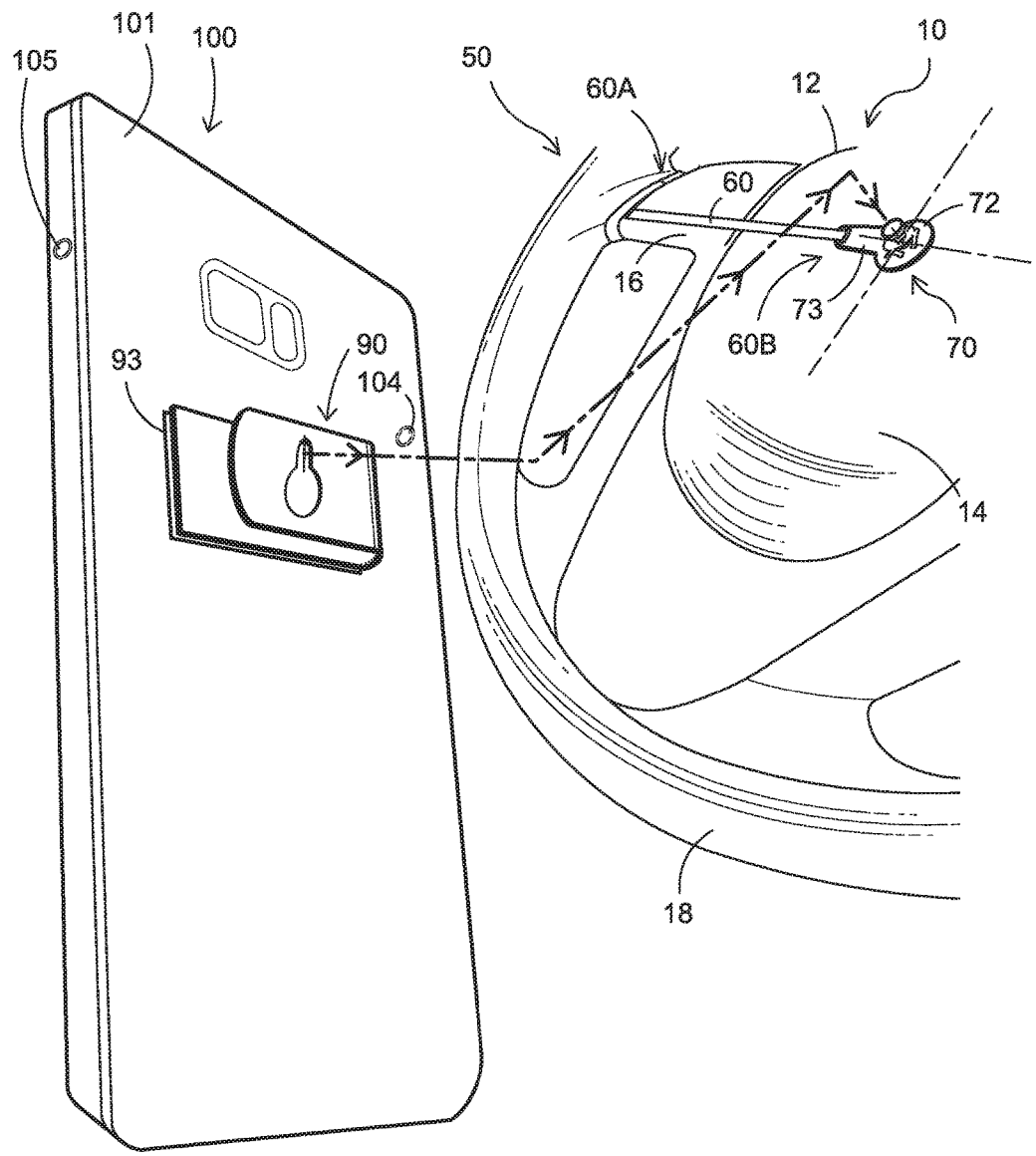
FIG. 25 is an exploded perspective view of the steering wheel assembly and mounting assembly of FIG. 24.
Figure 26:
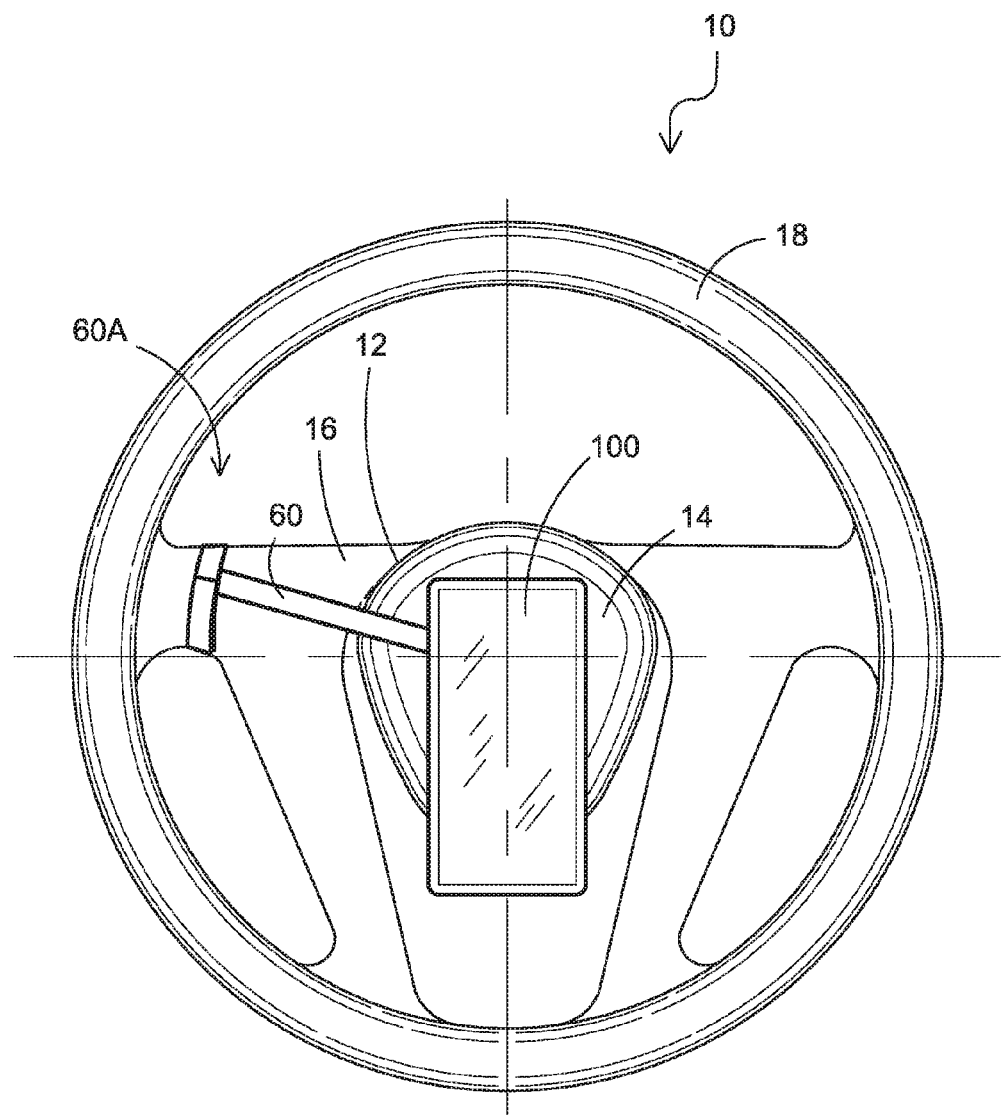
FIG. 26 is a front view of the steering wheel assembly and mounting assembly of FIG. 24.

As shown in FIGS. 24-26, the electronic device 100 may be alternatively or additionally attached to the steering wheel assembly 10 in a "low" position. As shown in FIG. 25, the clip 90 is attached to an upper portion 102A of the back surface 102 of the electronic device 100 such that the electronic device 100 may be attached to the steering wheel assembly 10 in the "low" position. In this "low" position, the center-of-gravity of the electronic device 100 may be located below the stud shaft 74 of the mounting stud assembly 70. As a result, in the "low" position, the electronic device 100 may have a propensity to orient itself in an upright position due to gravity.

It should be appreciated that although an exemplary "high" position and an exemplary "low" position are described herein, the clip 90 may be attached to any portion of the back surface 102 of the electronic device 100 such that the electronic device 100 may be secured to the steering wheel assembly 10 at any position.

Figure 27:
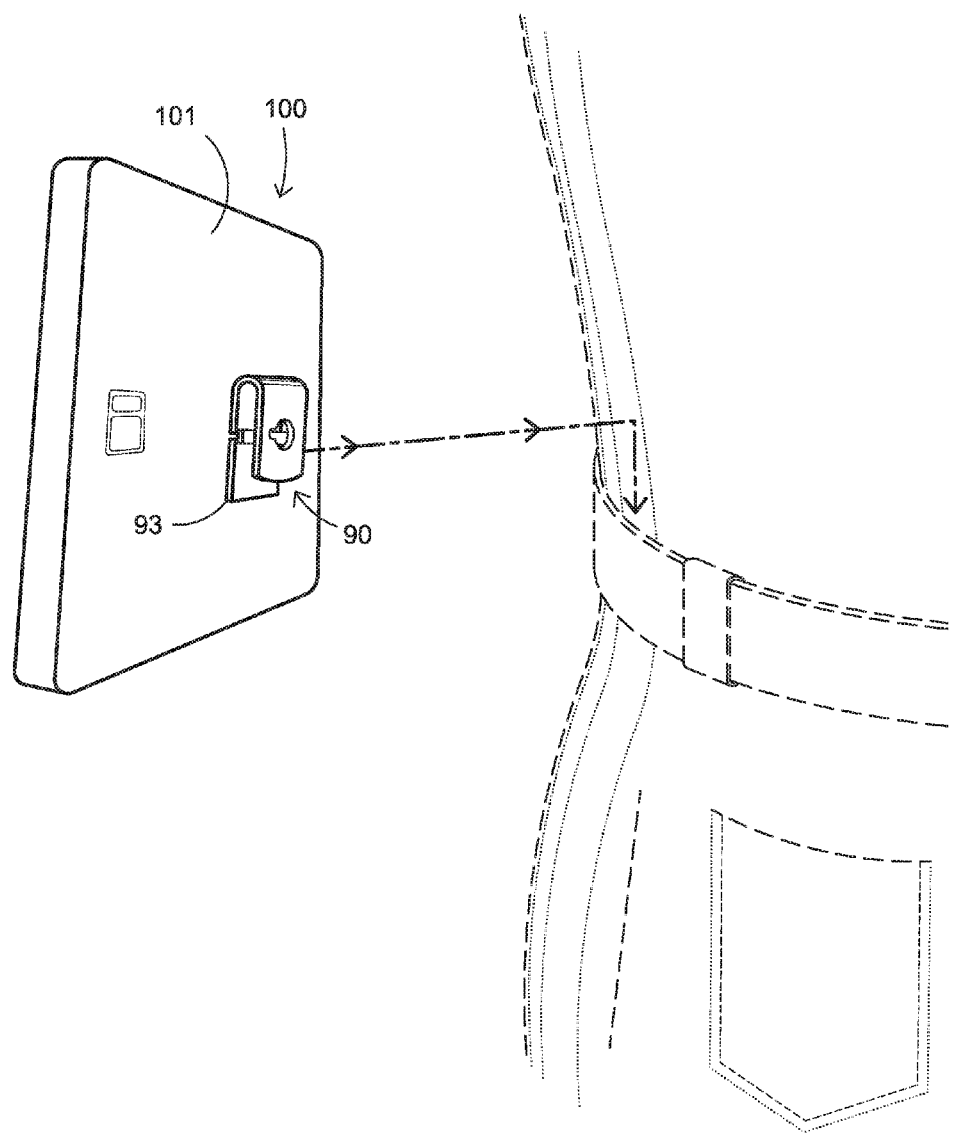
FIG. 27 is an exploded perspective view of the electronic device of FIG. 4 showing how the electronic device mates to a belt of a user via the clip of the mounting assembly on the user's left side.
Figure 28:
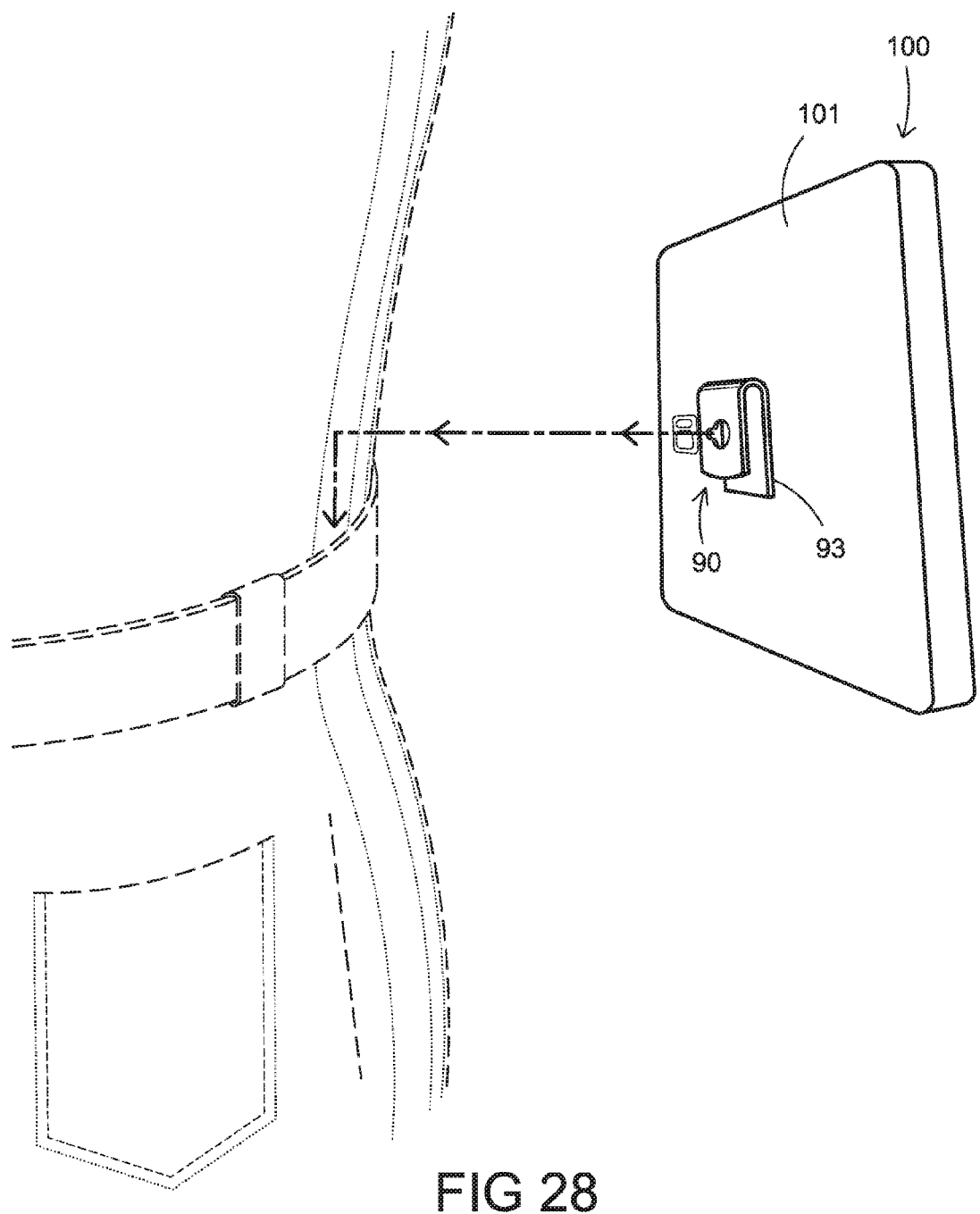
FIG. 28 is an exploded perspective view of the electronic device of FIG. 4 showing how the electronic device mates to a belt of a user via the clip of the mounting assembly on the user's right side.
Figure 29:
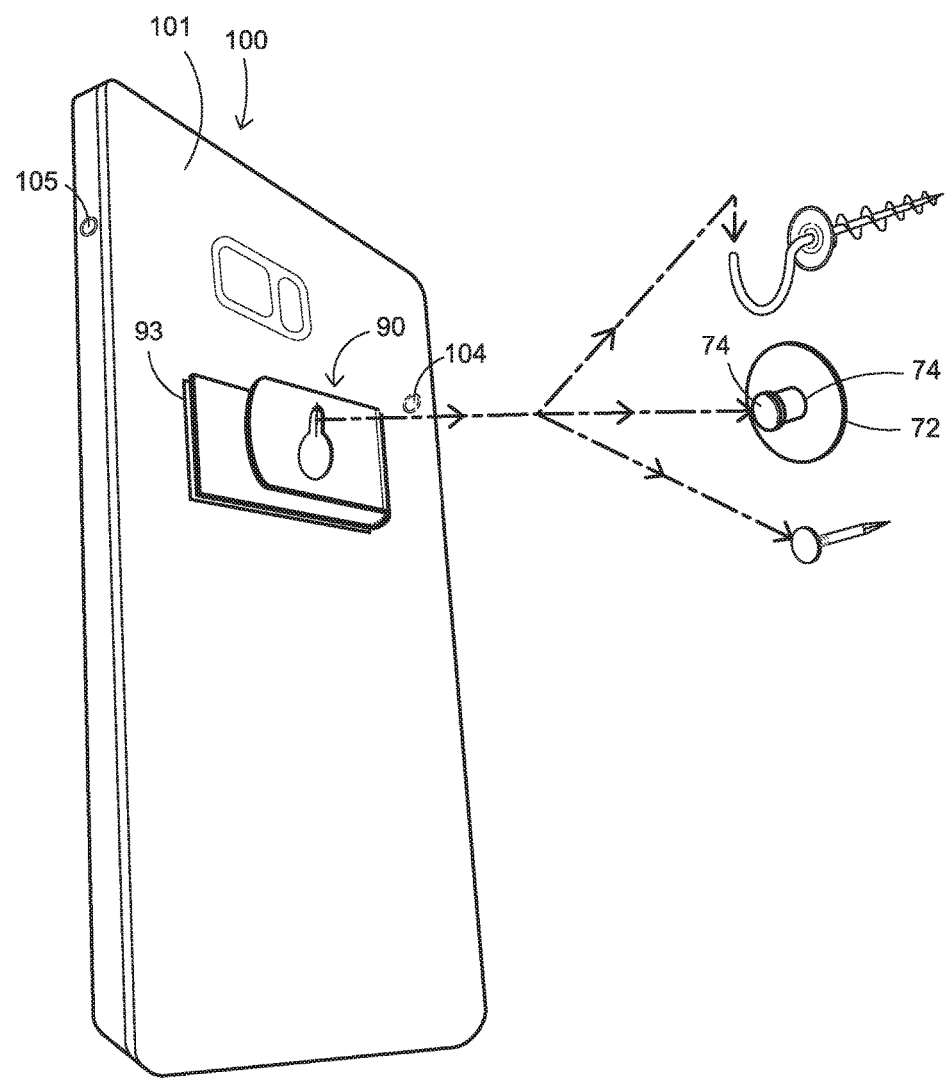
FIG. 29 is an exploded perspective view of the electronic device of FIG. 4 showing how the electronic device may be mated to a number of different types of fasteners via the clip of the mounting assembly.

As shown in FIGS. 27-29, when the electronic device 100 is detached from the mounting stud assembly 70, the clip 90 may be used to attach the electronic device 100 to other objects and/or surfaces besides the mounting stud assembly 70. For example, as shown in FIGS. 27 and 28, the clip 90 may be used to attach the electronic device 100 to a user's belt at the user's left side (FIG. 28) or right side (FIG. 27). Further, as shown in FIG. 29, the clip 90 may be used to attach the electronic device 100 to a number of different types of fasteners that may be attached to any appropriate object and/or surface (e.g., a wall, a desk, etc.). Accordingly, it should be appreciated that the clip 90 is uniquely versatile in its ability to allow the electronic device 100 to be attached to the mounting stud assembly 70 as well as other appropriate objects and/or surfaces.

The foregoing exemplary embodiments and advantages are merely exemplary and are not to be construed as limiting the present disclosure. The present teachings can be readily applied to other types of devices. Also, the description of the exemplary embodiments of the present disclosure is intended to be illustrative, and not to limit the scope of the claims, and many alternatives, modifications, and variations will be apparent to those skilled in the art.

The invention claimed is:
1. A mounting assembly for mounting an electronic device to a steering wheel assembly comprising a rotatable steering wheel with a center console supported by a steering column which is immovable relative to a rotation of said steering wheel, the mounting assembly comprising:

a means for attaching the electronic device to a rotational center of the steering wheel; and a stabilizing wand, a first end of the stabilizing wand being fixedly attached to said relative immovable steering column, a second end of the stabilizing wand being selectively attachable to the electronic device; wherein:

the steering wheel is freely rotatable while the electronic device is maintained in a vertical position by said support wand.

2. The mounting assembly of claim 1, wherein the means for attaching the electronic device comprises an axially located stud shaft protruding from a base attached to the steering wheel assembly, the stud shaft protruding from the base at the axis of rotation of the steering wheel assembly, and the electronic device is attached to the stud shaft such that a center-of-gravity of the electronic device is located above the stud shaft.

3. The mounting assembly of claim 1, wherein the stabilizing wand comprises a rigid or semi-rigid support member and at least one support clip, a first end of the support member being attached to the stationary portion of the vehicle interior by the at least one support clip, a second end of the support member being attached to the electronic device.

4. The mounting assembly of claim 3, further comprising:
a bracket attached to a backside of the electronic device, wherein the bracket is configured to receive the second end of the support member.

5. The mounting assembly of claim 3, wherein the bracket comprises a slot which in combination with the backside of the electronic device provides a passage configured to receive the second end of the support member.

6. The mounting assembly of claim 3, further comprising:
a clip attached to a backside of the electronic device, wherein the clip is configured to receive the second end of the support member.

7. The mounting assembly of claim 3, wherein the electronic device comprises a protective case configured to receive the second end of the support member.

8. The mounting assembly of claim 3, wherein the support member has a profile that corresponds to a profile of the steering wheel assembly.

9. The mounting assembly of claim 1, further comprising:
a cord attached to the stabilizing wand, wherein the cord is a power cord configured to provide power to the electronic device or a data cord configured to transmit data between the electronic device and the vehicle.

10. A mounting assembly for mounting an electronic device to a steering wheel assembly, the mounting assembly comprising:
a means for attaching the electronic device to a center of the steering wheel whereby gravity maintains the electronic device in a substantially upright position regardless of the rotation of the steering wheel; and
a restraining leash, a first end of the restraining leash being attached to the steering wheel assembly, a second end of the restraining leash being secured to the means for attaching the electronic device;
whereby in the event of an airbag deployment the restraining leash limits movement of the means for attaching the electronic device and the attached electronic device, thus preventing injury to the driver of the vehicle, wherein:
the means for attaching the electronic device comprises a headed stud shaft protruding from a base attached to the steering wheel assembly;

the steering wheel assembly comprises a steering wheel, and the base is attached to the steering wheel assembly such that the headed stud shaft extends collinearly along an axis of rotation of a steering wheel.

11. The mounting assembly of claim 10, wherein:
the steering wheel assembly comprises a steering wheel, and
the first end of the restraining leash is attached to a cross member of the steering wheel.

12. The mounting assembly of claim 10, wherein:
the steering wheel assembly comprises a steering wheel, and
the first end of the restraining leash is attached to a rim of the steering wheel.

13. The mounting assembly of claim 10, wherein
the means for attaching the electronic device comprises a headed stud shaft protruding from a base attached to the steering wheel assembly;
further comprising:
a clip, the clip being attached to the electronic device, wherein the clip is selectively attachable to the headed stud shaft.

14. The mounting assembly of claim 13, wherein:
the headed stud shaft comprises a smaller cross-sectional portion and a larger cross-sectional portion, the smaller portion comprising a portion of the headed stud shaft having a reduced width, the width of the smaller portion, taken perpendicular to the axis of the stud shaft, being less than a diameter of the stud shaft at the larger portion, and
the clip comprises an opening, the opening being configured to receive the stud shaft, the opening comprising:
a first opening; and
a second opening, wherein:
the first opening is larger than the second opening,
the first opening and the second opening overlap, and
a chord length, defined as the length of an opening between the first opening and the second opening, is less than the diameter of the larger cross-sectional portion of the stud shaft but greater than the width of the smaller cross-sectional portion of the stud shaft, whereby the electronic device is secured to the stud shaft.

15. The mounting assembly of claim 14, further comprising:
a biasing member, the biasing member being disposed on the stud shaft, the biasing member being configured to bias the clip toward the larger cross-sectional portion of the stud shaft.

16. The mounting assembly of claim 10, wherein:
the electronic device comprises at least one camera located on a side surface of the electronic device.

17. A mounting assembly for mounting an electronic device to a steering wheel assembly, the mounting assembly comprising:
a means for attaching the electronic device to a center of the steering wheel whereby gravity maintains the electronic device in a substantially upright position regardless of the rotation of the steering wheel; and
a restraining leash, a first end of the restraining leash being attached to the steering wheel assembly, a second end of the restraining leash being secured to the means for attaching the electronic device; whereby in the event of an airbag deployment the restraining leash limits movement of the means for attaching the electronic device and the attached electronic device, thus preventing injury to the driver of the vehicle, wherein the means for attaching the electronic device comprises an axially located headed stud shaft protruding from a base attached to the steering wheel assembly; and wherein the mounting assembly further comprises: a stabilizing wand, the stabilizing wand being configured to prevent rotation of the electronic device with the electronic device attached to the headed stud shaft.

18. The mounting assembly of claim 17, wherein:

the stabilizing wand comprises a support member, a first end of the support member being attached to the steering wheel assembly and a second end of the support member being attached to the electronic device.

19. A mounting assembly for mounting an electronic device to a steering wheel assembly, the mounting assembly comprising:

a base, the base being attached to a first portion of the steering wheel assembly;

an axially located headed stud headed shaft, the headed stud shaft protruding from the base at the axis of rotation of the steering wheel assembly, the stud shaft comprising a smaller cross-sectional portion and a larger cross-sectional portion, the smaller portion comprising a portion of the headed stud shaft having a reduced width, the width of the smaller portion, taken perpendicular to the axis of the headed stud shaft, being less than a diameter of the headed stud shaft at the larger, and a clip, the clip being attached to the electronic device, the clip being selectively attachable to the stud shaft, the clip comprising an opening, the opening being configured to receive the stud shaft, the opening comprising:

a first opening; and a second opening, wherein:

the first opening is larger than the second opening, the first opening and the second opening overlap, and a chord length, defined as the length of an opening between the first opening and the second opening, is less than the diameter of the larger portion of the stud shaft but greater than the width of the smaller portion of the stud shaft, whereby the electronic device is secured to the stud shaft.

20. The mounting assembly of claim 19, further comprising:

a biasing member, the biasing member being disposed on the stud shaft, the biasing member being configured to bias the clip toward the larger cross-sectional portion of the headed stud shaft.

21. The mounting assembly of claim 19, wherein, with the electronic device in an upright position, the second opening is located above the first opening.

22. The mounting assembly of claim 19, wherein, with the electronic device in a horizontal position, the second opening is located to the side of the first opening.

23. The mounting assembly of claim 19, further comprising:

a stabilizing wand, the stabilizing wand being configured to prevent rotation of the electronic device with the electronic device attached to the stud shaft.

24. The mounting assembly of claim 23, wherein:

the stabilizing wand comprises a support member, a first end of the support member being attached to the steering wheel assembly and a second end of the support member being attached to the electronic device.

\* \* \* \* \*